US012474062B2

(12) United States Patent
Ryu et al.

(10) Patent No.: US 12,474,062 B2
(45) Date of Patent: Nov. 18, 2025

(54) HOME APPLIANCE

(71) Applicant: LG ELECTRONICS INC., Seoul (KR)

(72) Inventors: Siyoung Ryu, Seoul (KR); Dongkwan Yu, Seoul (KR); Eunseo Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 18/422,585

(22) Filed: Jan. 25, 2024

(65) Prior Publication Data

US 2024/0318829 A1 Sep. 26, 2024

(30) Foreign Application Priority Data

Mar. 23, 2023 (KR) ........................ 10-2023-0038135

(51) Int. Cl.
*E05D 11/10* (2006.01)
*E05D 11/08* (2006.01)
*F24C 15/02* (2006.01)

(52) U.S. Cl.
CPC .......... *F24C 15/023* (2013.01); *E05D 11/087* (2013.01); *E05Y 2201/10* (2013.01);
(Continued)

(58) Field of Classification Search
CPC ... F16F 15/03; F16F 6/00; F16F 6/005; F24C 15/02; F24C 15/023; E05F 1/1276; E05F 1/1292; E05F 1/1261; E05F 1/1253; E05F 3/02; E05F 3/10; E05Y 2201/41; E05Y 2201/412; E05Y 2201/414; E05Y 2201/416; E05Y 2201/40; E05Y 2201/46; E05Y 2900/30; E05Y 2900/302; E05Y 2900/304; E05Y 2900/308; E05Y 2600/528; E05Y 2600/626; E05Y 2201/10;
(Continued)

(56) References Cited

U.S. PATENT DOCUMENTS 5,724,683 A * 3/1998 Sorimachi .............. A47K 13/12 16/303
6,065,187 A * 5/2000 Mischenko ......... H04M 1/0216 16/303
(Continued)

FOREIGN PATENT DOCUMENTS

JP 2007-107874 4/2007
KR 10-2009-0113975 11/2009
WO WO 2010/061776 6/2010

OTHER PUBLICATIONS

Extended European Search Report dated Jun. 20, 2024 issued in Application No. 24153607.7.

*Primary Examiner* — Chuck Y Mah
(74) *Attorney, Agent, or Firm* — KED & ASSOCIATES, LLP

(57) ABSTRACT

Disclosed is a home appliance including a hinge assembly that generates a force to resist a force applied by a self-weight of a door and pivotably connects the door to a main body, wherein the hinge assembly includes a movable portion rotatable in association with the pivoting of the door, and a fixed portion that receives the force applied by the self-weight of the door and converts the received force into a force to move the movable portion in one direction.

17 Claims, 17 Drawing Sheets

(52) U.S. Cl.
CPC ... *E05Y 2201/474* (2013.01); *E05Y 2600/528* (2013.01); *E05Y 2600/626* (2013.01); *E05Y 2900/308* (2013.01)

(58) Field of Classification Search
CPC ........... E05Y 2201/11; E05Y 2201/638; E05Y 2201/474; E05Y 2201/50; E05Y 2800/102; E05Y 2800/45; E05D 11/087; E05D 11/084; E05D 11/085; E05D 3/18; E05D 3/122; A47L 15/4265
See application file for complete search history.

(56) References Cited

U.S. PATENT DOCUMENTS

| | | | | |
|---|---|---|---|---|
| 7,127,911 | B2 * | 10/2006 | Nam | E05F 1/1215 16/284 |
| 7,228,596 | B2 | 6/2007 | Kang | |
| 7,712,186 | B2 | 5/2010 | Kang | |
| 7,818,845 | B2 * | 10/2010 | Hu | H04M 1/0216 16/303 |
| 7,926,146 | B2 * | 4/2011 | Duan | G06F 1/1616 16/303 |
| 9,435,545 | B2 | 9/2016 | Chin et al. | |
| 9,739,523 | B1 * | 8/2017 | Augsburger | E05D 3/02 |
| 2004/0261220 | A1 * | 12/2004 | Lowry | G06F 1/1681 16/50 |
| 2005/0091794 | A1 * | 5/2005 | Kang | F25D 23/028 16/284 |
| 2006/0101618 | A1 * | 5/2006 | Minami | G06F 1/1681 16/303 |
| 2007/0039135 | A1 * | 2/2007 | Duan | H04M 1/0216 16/330 |
| 2007/0089273 | A1 * | 4/2007 | Kang | F25D 23/028 16/330 |
| 2014/0125210 | A1 * | 5/2014 | Park | D06F 39/14 312/319.1 |
| 2015/0345203 | A1 | 12/2015 | Vanini | |
| 2018/0216832 | A1 * | 8/2018 | White | F24C 15/023 |
| 2022/0147113 | A1 * | 5/2022 | Yang | G06F 1/1681 |

* cited by examiner (a)

(b)

(a)

(b)

(a)

(b)

HOME APPLIANCE

CROSS-REFERENCE TO RELATED APPLICATION(S)

This application claims priority to and the benefit of Korean Patent Application No. 10-2023-0038135, filed in Korea on Mar. 23, 2023, the disclosure of which is incorporated herein by reference in its entirety.

BACKGROUND

1. Field

The present invention relates to a home appliance, and more specifically, to a home appliance having a door to open and close an internal space.

2. Background

The present invention relates to a home appliance, and more specifically, to a home appliance having a door to open and close an internal space.

A cooking appliance is a type of home appliance for cooking food and is installed in a kitchen space to cook the food based on an intention of a user. Such cooking appliance may be classified in various ways depending on a heat source used, a shape, and a type of fuel.

When classifying the cooking appliance based on a type of cooking the food, the cooking appliance may be classified into an open cooking appliance and a closed cooking appliance depending on a shape of a space where the food is placed. The closed cooking appliance includes an oven, a microwave, and the like, while the open cooking appliance includes a cooktop, a hob, and the like.

The closed cooking appliance is a cooking appliance that shields the space where the food is located and cooks the food by heating the shielded space. In the closed cooking appliance, a cooking chamber, which is the space where the food is placed and shielded when the food is to be cooked, is provided. Such cooking chamber becomes a space where the food is being cooked.

In the closed cooking appliance, a door that selectively opens and closes the cooking chamber is pivotably disposed. The door may be pivotably installed on a main body by a door hinge disposed between the door and the main body with the cooking chamber formed therein. Such a door may selectively open and close the cooking chamber by pivoting around a portion coupled to the main body via the door hinge.

Generally, pull-down-type doors are widely applied to the closed cooking appliances. In the pull-down-type door, a lower end of the door may be pivotably coupled to the main body via the door hinge.

Such a door may pivot downwards around the lower end thereof pivotably coupled to the main body to open the cooking chamber. Additionally, the door may pivot upwards while the cooking chamber is open to close the cooking chamber.

In the pull-down-type door, a phenomenon in which the door pivots and opens rapidly after the door is opened by an angle equal to or greater than a certain angle may occur. This is because a pivoting speed of the door gradually increases because of a self-weight of the door while the door is opening.

The rapid pivoting of the door may not only cause anxiety to the user, but may also cause an injury of the user.

BRIEF DESCRIPTION OF THE DRAWINGS

Embodiments will be described in detail with reference to the following drawings in which like reference numerals refer to like elements wherein.

DETAILED DESCRIPTION

Figure 1:
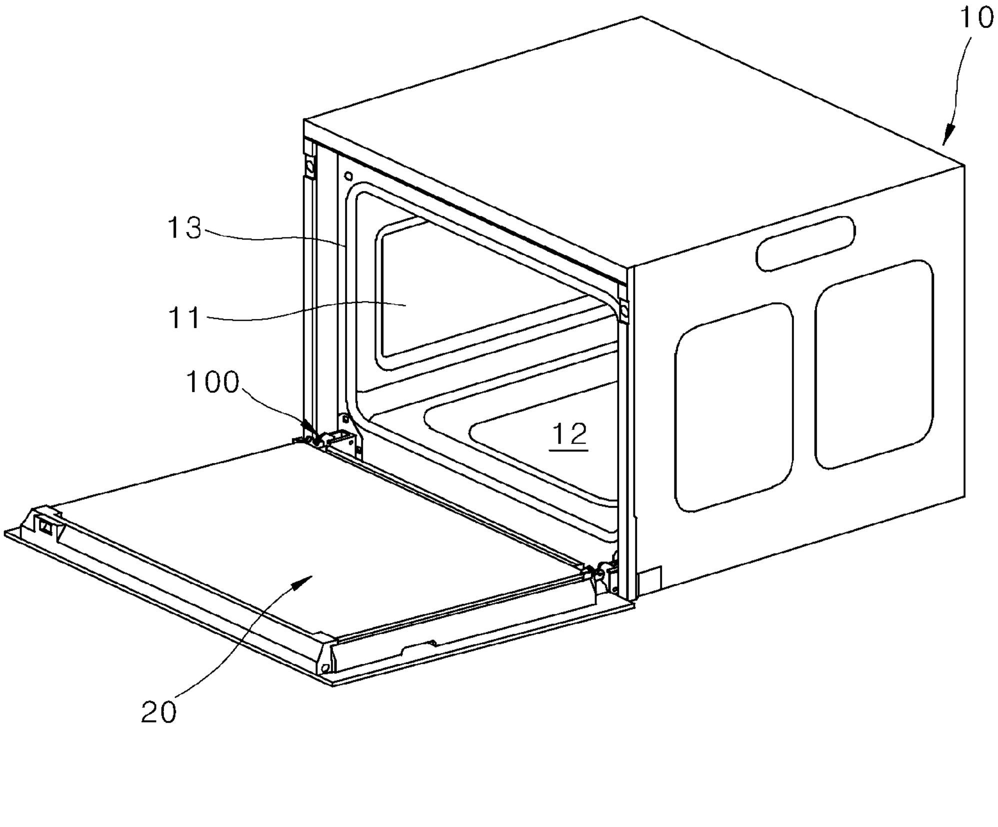
FIG. 1 is a perspective view showing a home appliance according to an embodiment of the present invention.

The above-mentioned purposes, features, and advantages will be described in detail later with reference to the attached drawings, so that those skilled in the art in the technical field to which the present invention belongs may easily implement the technical ideas of the present invention. In describing the present invention, when it is determined that a detailed description of the publicly known technology related to the present invention may unnecessarily obscure the gist of the present invention, the detailed description will be omitted. Hereinafter, a preferred embodiment according to the present invention will be described in detail with reference to the attached drawings. In the drawings, identical reference numerals are used to indicate identical or similar components.

Although first, second, and the like are used to describe various components, these components are not limited by such terms. Such terms are only used to distinguish one component from another component, and unless specifically stated to the contrary, a first component may also be a second component.

The present invention may not be limited to embodiments disclosed below, and various changes may be made and the present invention may be implemented in various different forms. The present embodiment is provided solely to ensure that the disclosure of the present invention is complete and to fully inform those skilled in the art of the scope of the invention. Therefore, it should be understood that the present invention is not limited to the embodiments disclosed below, but includes all changes, or substitutes included in the technical idea and the scope of the present invention, as well as substitution of components of one embodiment with components of another embodiment and addition of components.

The attached drawings are only for easy understanding of the embodiments disclosed herein, and the technical ideas disclosed herein are not limited by the attached drawings. Further, it should be understood that the present invention includes all modifications, or substitutions that fall within the technical concept and scope of the present invention. In drawings, components may be expressed exaggeratedly large or small in size or thickness for convenience of understanding or the like, but the scope of protection of the present invention should not be interpreted as limited by the same.

The terms used herein are merely used to describe specific implementations or embodiments, and are not intended to limit the present invention. Further, singular expressions include plural expressions, unless the context clearly dictates otherwise. Herein, terms such as "include", "composed of", and the like are intended to indicate the existence of features, numbers, steps, operations, components, parts, or combinations thereof described herein. That is to say, it should be understood that terms such as "include", "composed of", and the like as used herein do not exclude in advance the presence or addition of one or more other features, numbers, steps, operations, components, parts, or combinations thereof.

Terms including ordinal numbers, such as first, second, and the like, may be used to describe various components, but the components are not limited by the terms. The above terms are used only for the purpose of distinguishing one component from another.

When a first component is described as being "connected" or "coupled" to a second component, it should be understood that the components may be directly connected or coupled to each other, but a third component may be interposed between the components. On the other hand, when it is described that the first component is "directly connected" or "directly coupled" to the second component, it should be understood that there are no other components interposed therebetween.

When a first component is described to be "on top of" or "under" a second component, it is understood that the first component may be disposed in contact with a top surface (or a bottom surface) of the second component, as well as a third component may be interposed therebetween.

Unless otherwise defined, all terms used herein, including technical or scientific terms, have the same meaning as commonly understood by a person of ordinary skill in the technical field to which the present invention pertains. Terms defined in commonly used dictionaries should be interpreted as having a meaning consistent with the meaning in the context of the related technology, and unless explicitly defined in the present application, should not be interpreted in an ideal or excessively formal sense.

When a home appliance is placed on the floor, a side on which a door is installed, relative to a center of the home appliance is defined as a front side. Therefore, a direction of opening the door and entering the home appliance becomes a rearward direction.

Additionally, the direction of gravity may be defined as a downward direction, and a direction opposite to the direction of gravity may be defined as an upward direction.

In addition, a horizontal direction orthogonal to a front and rear direction of the home appliance, that is, a width direction of the home appliance when viewing the home appliance in front of the door thereof, may be referred to as a left and right direction.

In addition, a width direction of the home appliance may be referred to as a lateral direction. Then, a left side may be referred to as one side in the lateral direction, and a right side may be referred to as the other side in the lateral direction.

Additionally, the vertical direction described above may be referred to as a height direction. Then, the front and rear direction and the left and right direction may be referred to as a transverse direction.

Throughout the present document, "A and/or B" means A, B, or A and B, unless otherwise specified, and "C to D" means equal to or greater than C and equal to or smaller than D unless otherwise specified.

[Overall Structure of Home Appliance]

Figure 2:
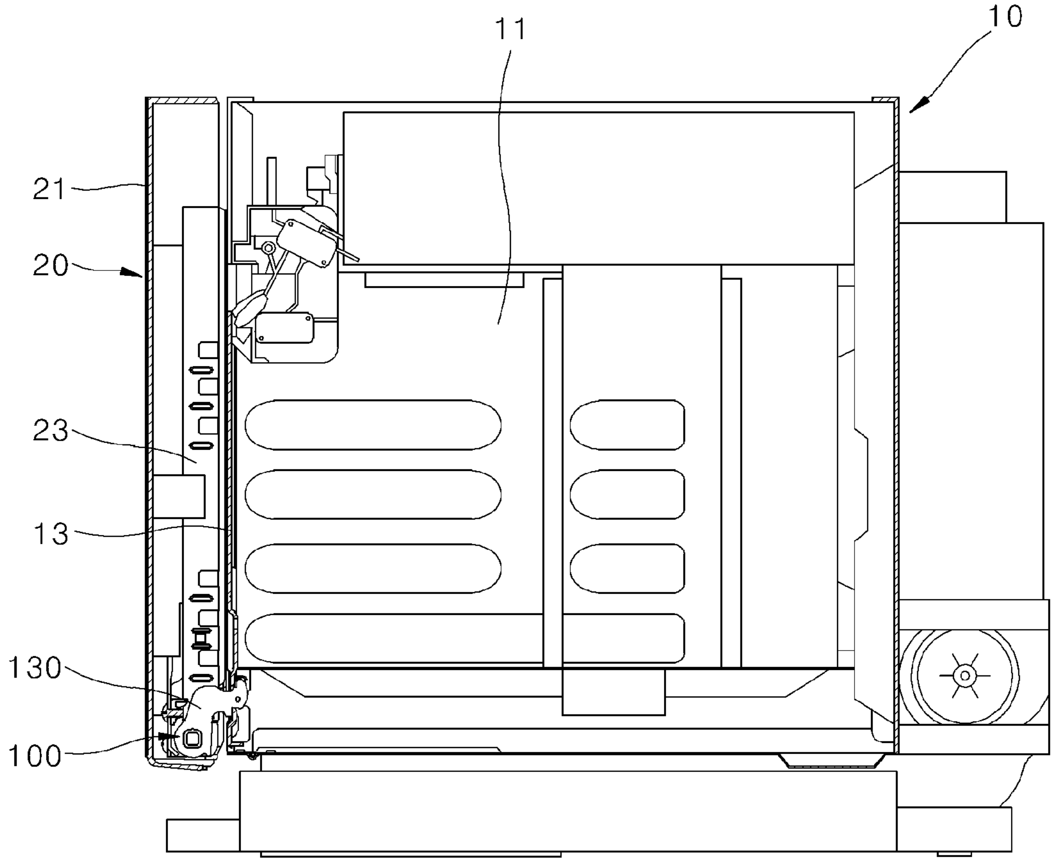
FIG. 2 is a cross-sectional view showing an internal structure of a home appliance shown in FIG. 1.

FIG. 1 is a perspective view showing a home appliance according to an embodiment of the present invention, and FIG. 2 is a perspective view showing an open state of a cooking chamber of a home appliance shown in FIG. 1.

Referring to FIGS. 1 and 2, an outer appearance of a home appliance according to one embodiment of the present invention may be formed by a main body 10. The main body 10 may be formed to have a substantially rectangular parallelepiped shape. Such a main body 10 may be made of a material with a predetermined strength to protect multiple components installed in an internal space thereof.

The main body 10 may include a cavity 11. The cavity 11 may form a skeleton of the main body 10.

Additionally, the main body 10 may further include a front panel 13. The front panel 13 may be disposed at a front portion of the cavity 11 to form a front surface of the main body 10.

As another example, the front panel 13 may not be formed separately from the cavity 11, and a front surface of the cavity 11 may form the front surface of the main body 10. For example, the cavity 11 and the front panel 13 may be integrally formed with each other and disposed in the main body 10.

A receiving space 12 may be defined inside the cavity 11. The receiving space 12 may be defined in a shape of a hexahedron with an open front surface. When the home appliance is a cooking appliance, the home appliance may heat the receiving space 12 to cook food.

A door 20 may be disposed at a front side of the main body 10. The door 20 may be pivotably installed at the front side of the main body 10, and may selectively open and close the receiving space 12 at the front side of the receiving space 12.

As an example, the door 20 may be formed in a shape of a hexahedron with a constant predetermined thickness. Such a door 20 may open and close the receiving space 12 using a pull-down scheme in which an upper end thereof pivots in a vertical direction around a lower end thereof.

The front surface of the main body 10 formed by the front panel 13 or the front surface of the cavity 11 may be covered by the door 20 that closes the receiving space 12. When the door 20 opens the receiving space 12, the front surface of the main body 10 may be exposed forwards along with the receiving space 12.

[Rough Structure of Door]

Figure 3:
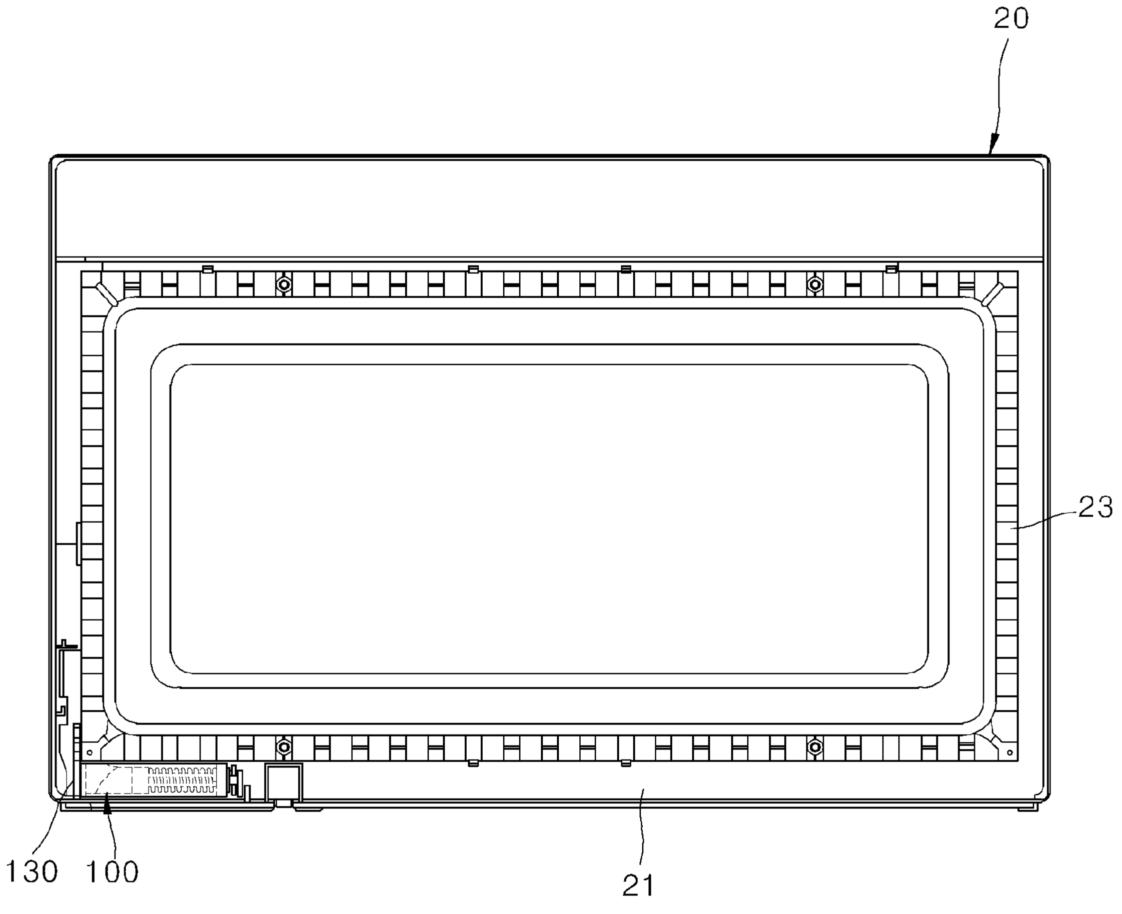
FIG. 3 is a rear view showing a rear surface of a door shown in FIG. 1.

FIG. 3 is a rear view showing a rear surface of a door shown in FIG. 1.

Referring to FIGS. 1 to 3, the door 20 may include a door panel 21.

The door panel 21 may form a skeleton of the door 20 and may form an outer appearance of a top surface, a bottom surface, and side surfaces of the door 20. As an example, the door panel 21 may be formed in an approximately hexahedral shape.

The door 20 may further include a door frame 23. The door frame 23 may be coupled to a rear side of the door panel 21 to form a rear surface of the door 20.

A hinge assembly 100 that pivotably couples the door 20 to the main body 10 may be installed at a lower side of the door frame 23. The hinge assembly 100 may be installed at a lower end of the door frame 23, and may be installed at both sides in the lateral direction of the door frame 23. A detailed structure of the hinge assembly 100 will be described later.

Through portions may be defined in the door panel 21 and the door frame 23. The through portions may be defined to be penetrated in the front and rear direction in the door panel 21 and the door frame 23.

As an example, glass may be installed in the door 20. The glass may cover the through portion from the front and may be coupled to the door panel 21. In this case, the door frame 23 may also have the through portion connected to the through portion of the door panel 21.

As another example, a display panel may be installed in the door 20. The display panel may be exposed in a forward direction of the door 20 and may provide a function of displaying the inside of the receiving space 12 as an image or displaying a state of the home appliance. In this case, the through portion may be defined only in the door panel 21, and the through portion may not be defined in the door frame 23.

The door 20 may pivot in a first direction or a second direction around the hinge assembly 100 disposed at the lower end of the door 20. The door 20 may open the receiving space 12 by pivoting around the lower end thereof in the first direction, that is, in a forward and downward direction. Additionally, the door 20 may close the receiving space 12 by pivoting around the lower end thereof in a second direction, that is, in a rearward and upward direction.

[Structure of Hinge Assembly]

Figure 4:
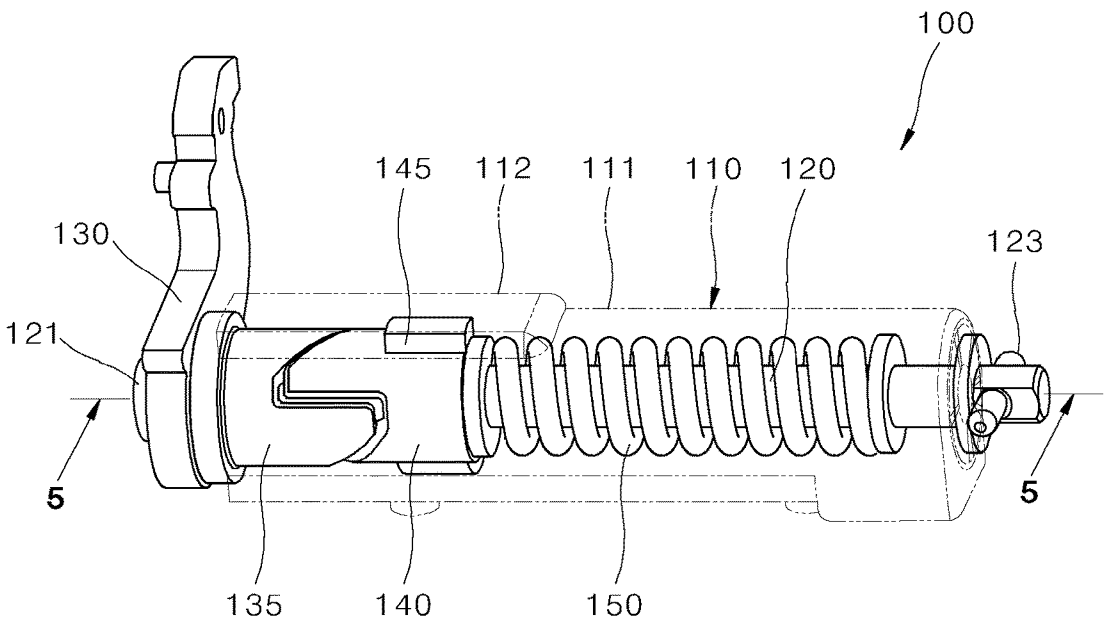
FIG. 4 is a perspective view separately showing a hinge assembly shown in FIG. 3.
Figure 5:
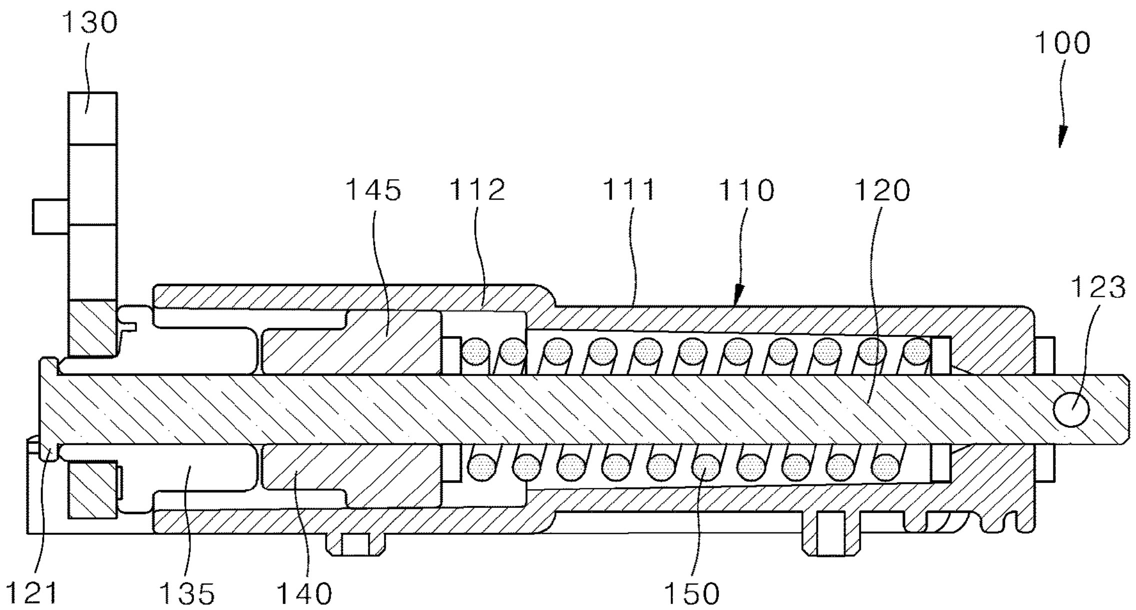
FIG. 5 is a cross-sectional view taken along a line "5-5" in FIG. 4.
Figure 6:
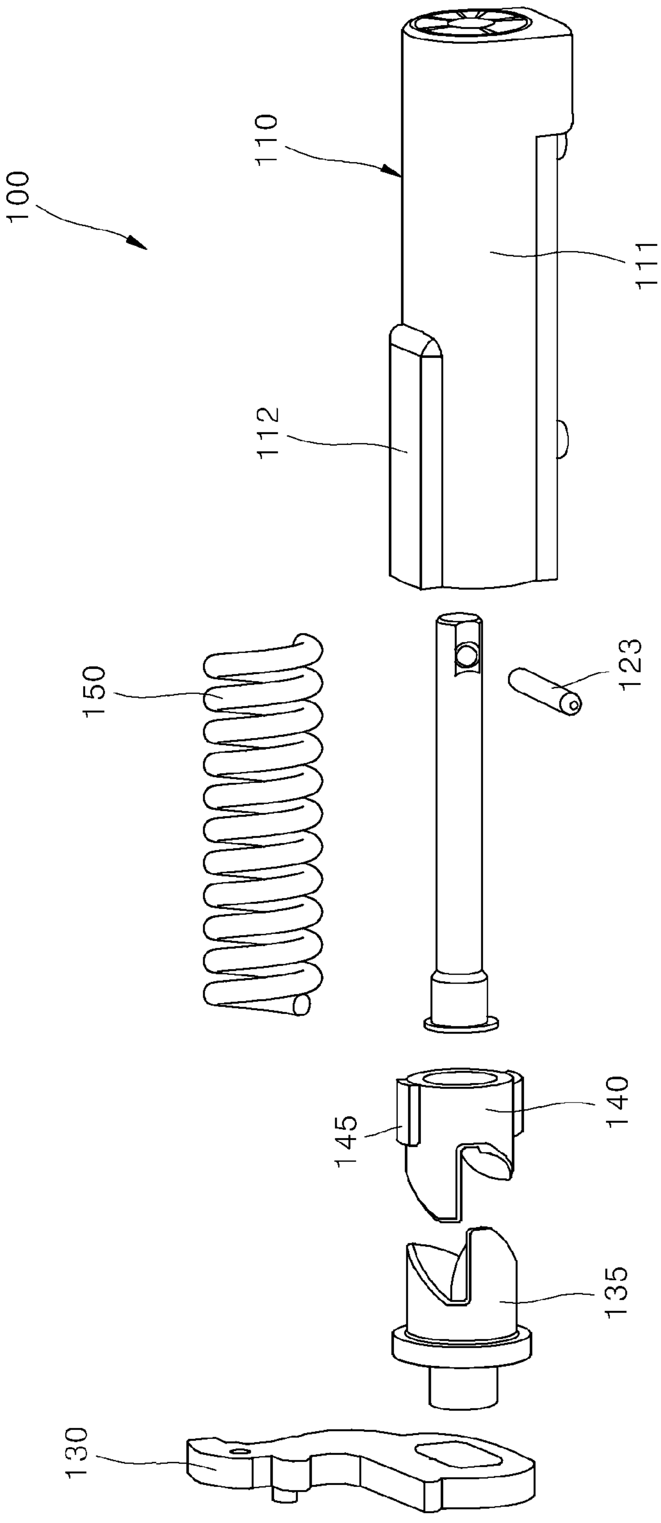
FIG. 6 is an exploded perspective view showing a disassembled state of a hinge assembly shown in FIG. 4.

FIG. 4 is a perspective view separately showing a hinge assembly shown in FIG. 3, FIG. 5 is a cross-sectional view taken along a line "5-5" in FIG. 4, and FIG. 6 is an exploded perspective view showing a disassembled state of a hinge assembly shown in FIG. 4.

Referring to FIGS. 3 to 6, the hinge assembly 100 may be installed on the door 20. Such a hinge assembly 100 may pivotably connect the door 20 to the main body 10.

The hinge assembly 100 may include a casing 110. The casing 110 may form an outer appearance of the hinge assembly 100 and may accommodate various components constituting the hinge assembly 100 therein.

The casing 110 may be coupled to the door frame 23, and a front side of the hinge assembly 100 may be connected to the door 20 via coupling between the casing 110 and the door frame 23. As an example, the casing 110 may be coupled to the door frame 23 via a bracket 30 (see FIG. 10), which will be described later.

A rear side of the hinge assembly 100 may be connected to the main body 10 by being coupled to the front surface of the main body 10. According to the present embodiment, the hinge assembly 100 may include fixed portions 130 and 135. In addition, the fixed portions 130 and 135 may include the hinge arm 130.

The hinge arm 130 may connect the main body 10 with the fixed portions 130 and 135. A rear end of such hinge arm 130 may be coupled to the main body 10. As an example, the rear end of the hinge arm 130 may be fixed to the main body 10 by being coupled to the front panel 13 or the cavity 11 while extending through the front panel 13 in the front and rear direction.

As described above, the hinge arm 130 fixed to the main body 10 may be formed in a shape that protrudes forward from the front surface of the main body 10 toward the door 20. A front end of the hinge arm 130 may be coupled to the fixed portions 130 and 135 disposed on the door 20.

The hinge arm 130 may be disposed adjacent to an end in the lateral direction of the front panel 13 and may be disposed between the end in the lateral direction of the front panel 13 and the casing 110.

Additionally, the fixed portions 130 and 135 may include the fixed cam 135. The fixed cam 135 may be fixed to the hinge arm 130, and at least a portion of the fixed cam 135 may be inserted into the casing 110.

In the present embodiment, the casing 110 is illustrated as being formed in a lying cylindrical shape. Such a casing 110 may have a length extending in the lateral direction, and a hollow extending in the lateral direction may be defined inside the casing 110.

One end of the casing 110 may be open in the lateral direction, and the fixed cam 135 may be inserted into the casing 110 via the one end of the casing 110 that is open. As such, the fixed cam 135 inserted into the casing 110 may be connected to movable portions 140 and 145 inside the casing 110.

For example, the fixed cam 135 may be inserted into the casing 110 such that an outer circumferential surface of the fixed cam 135 and an inner circumferential surface of the casing 110 face each other, and connection of the fixed cam 135 and the movable portions 140 and 145 may be achieved as the fixed cam 135 and the movable portions 140 and 145 are engaged with each other in the lateral direction.

Additionally, one side of the fixed cam 135 may protrude to the outside of the casing 110, and the hinge arm 130 may be coupled to the one side of the fixed cam 135 that protrudes to the outside of the casing 110.

That is, the fixed cam 135 may be fixed by the hinge arm 130 and may be connected to the casing 110 and the movable portions 140 and 145 freely from rotation of the casing 110 and the movable portions 140 and 145.

In addition, the hinge assembly 100 may further include a shaft 120. The shaft 120 may extend through the casing 110 in the lateral direction, and most of the shaft 120 may be accommodated inside the casing 110. One end of the shaft 120 may be fixed to the fixed cam 135 or the hinge arm 130.

As an example, a flange 121 may be formed at the one end of the shaft 120. The flange 121 may protrude in a centrifugal direction from the shaft 120 and be disposed outwardly of the fixed cam 135, and the other end of the shaft 120 may be coupled to a coupling pin 123 on the outside of the casing 110. The shaft 120 may be fixed by the flange 121 disposed on one side of the shaft 120 and the coupling pin 123 coupled to the other side of the shaft 120.

The movable portions 140 and 145 may be accommodated inside the casing 110. Such movable portions 140 and 145 may be rotated in association with the pivoting of the door 20. As an example, the movable portions 140 and 145 may be rotated by the casing 110 rotating with the door 20.

Additionally, the movable portions 140 and 145 may be accommodated within the casing 110 so as to be movable in a linear direction.

According to the present embodiment, the fixed cam 135 and the movable portions 140 and 145 may be arranged in the lateral direction inside the casing 110. In addition, the shaft 120 may extend through the fixed cam 135 and the movable portions 140 and 145 in the lateral direction inside the casing 110.

As an example, the movable portions 140 and 145 may include the movable cam 140 engaged with the fixed cam 135. The movable cam 140 may rotate with the casing 110 around the shaft 120. Additionally, the movable cam 140 may be coupled to the shaft 120 so as to be slidable in the lateral direction and may move in the lateral direction along the shaft 120.

As an example, each of the fixed cam 135 and the movable cam 140 may be provided in a form of an end cam. Therefore, a side cross-section of the fixed cam 135 facing the movable cam 140 may be formed as a cam curve, and a side cross-section of the movable cam 140 facing the fixed cam 135 may also be formed as a cam curve.

When the door 20 pivots, the movable cam 140 may rotate together with the casing 110, which rotates together with the door 20. Such a movable cam 140 may move in the lateral direction while rotating in the state of being engaged with the fixed cam 135.

Hereinafter, a direction toward the other side of the lateral direction, that is, a direction toward a center in the lateral direction of the door 20, will be defined as a third direction. Additionally, a direction toward one side of the lateral direction, that is, a direction opposite to the third direction, will be defined as a fourth direction.

The movable portions 140 and 145 may include the sliding protrusion 145. The sliding protrusion 145 may be formed to protrude in the centrifugal direction from an outer circumferential surface of the movable cam 140.

In response thereto, a sliding groove 112 may be defined in the casing 110. The sliding groove 112 may be defined in a form in which a portion of the casing 110 protrudes in the centrifugal direction. An inner circumferential surface of such a sliding groove 112 may be disposed at a location that protrudes more in the centrifugal direction than the inner circumferential surface of the casing 110.

The sliding protrusion 145 may be inserted into the sliding groove 112. As the sliding protrusion 145 is fitted into the sliding groove 112, the movable cam 140 may be coupled to the casing 110 so as to rotate together with the casing 110.

The sliding groove 112 may extend in the lateral direction, and the sliding protrusion 145 may move along the sliding groove 112 in the lateral direction. That is, the movement of the movable cam 140 in the lateral direction may be guided by the sliding groove 112.

According to the present embodiment, when the door 20 pivots in the first direction, the movable cam 140 may rotate in the first direction together with the door 20 and the casing 110 and move in the third direction. In addition, when the door 20 pivots in the second direction, the movable cam 140 may rotate in the second direction together with the door 20 and the casing 110 and move in the fourth direction.

Additionally, the hinge assembly 100 may include a pressing portion 150. The pressing portion 150 is disposed to apply a force to move the movable portions 140 and 145 to the other side in the lateral direction, that is, a force to move the movable portions 140 and 145 in the fourth direction, to the movable portions 140 and 145. Hereinafter, the force to move the movable portions 140 and 145 in the fourth direction will be referred to as a "first force."

The pressing portion 150 may include an elastic member that generates an elastic force to press the movable portions 140 and 145 in the fourth direction. Accordingly, the first force may be the elastic force generated from the elastic member.

As an example, the pressing portion 150 may be formed in a shape of a coil spring that contracts and expands in the lateral direction, and may be accommodated inside the casing 110. One end of such a pressing portion 150 may support the movable cam 140, and the other end of the pressing portion 150 may be supported by the other end of the casing 110.

[Operation of Hinge Assembly]

Figure 7:
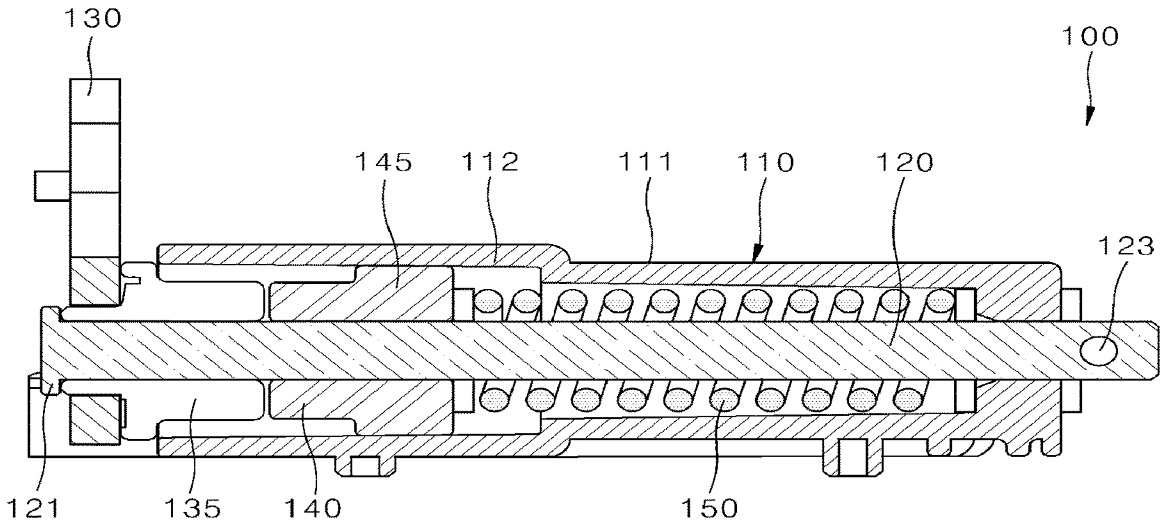
FIGS. 7 to 9 are cross-sectional views showing a relationship between an opening angle of a door and an operating state of a hinge assembly.
Figure 7:
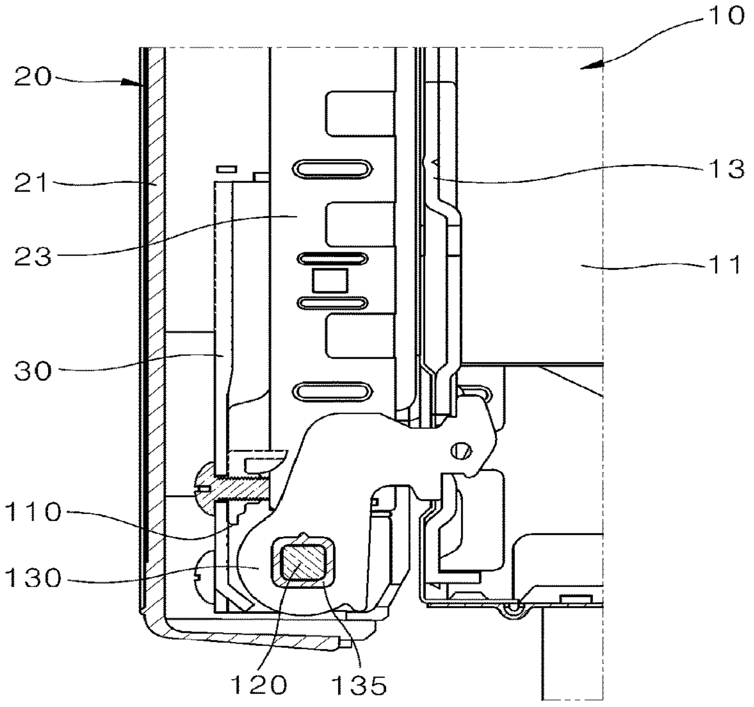
Figure 8:
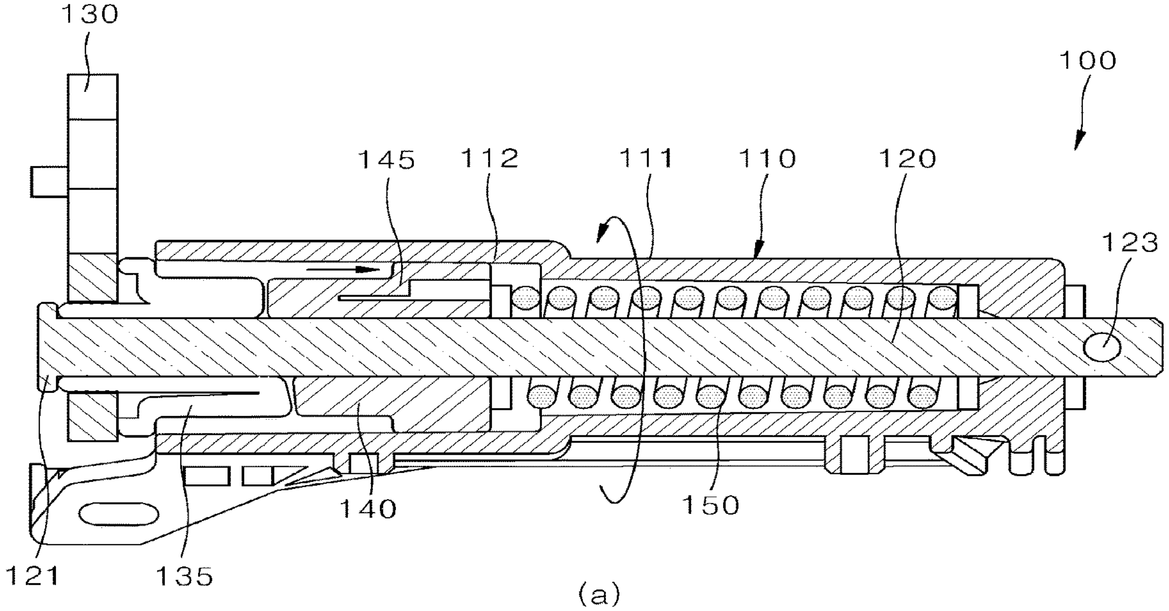
Figure 8:
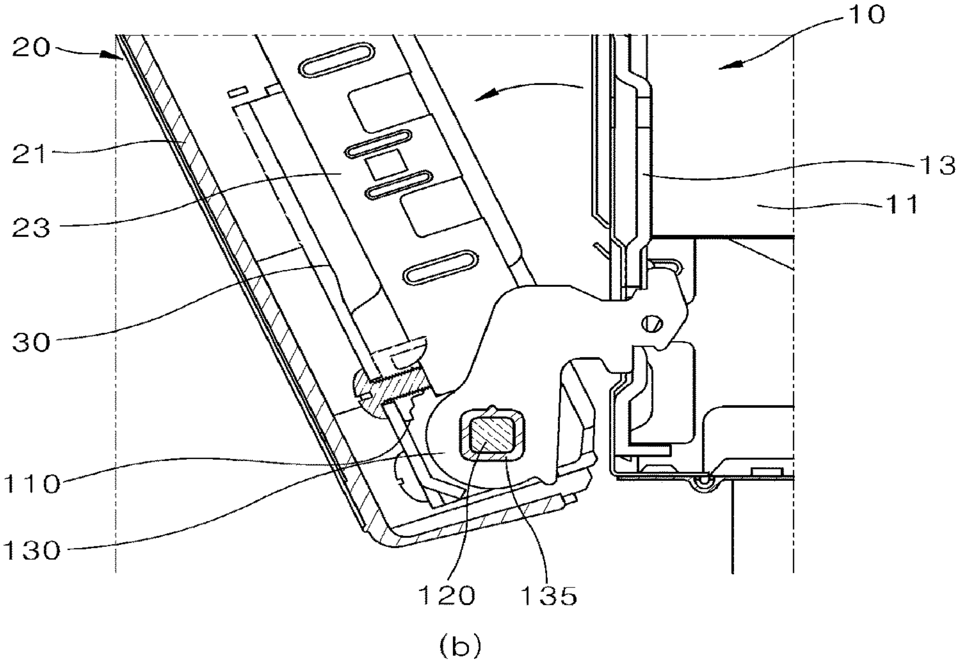
Figure 9:
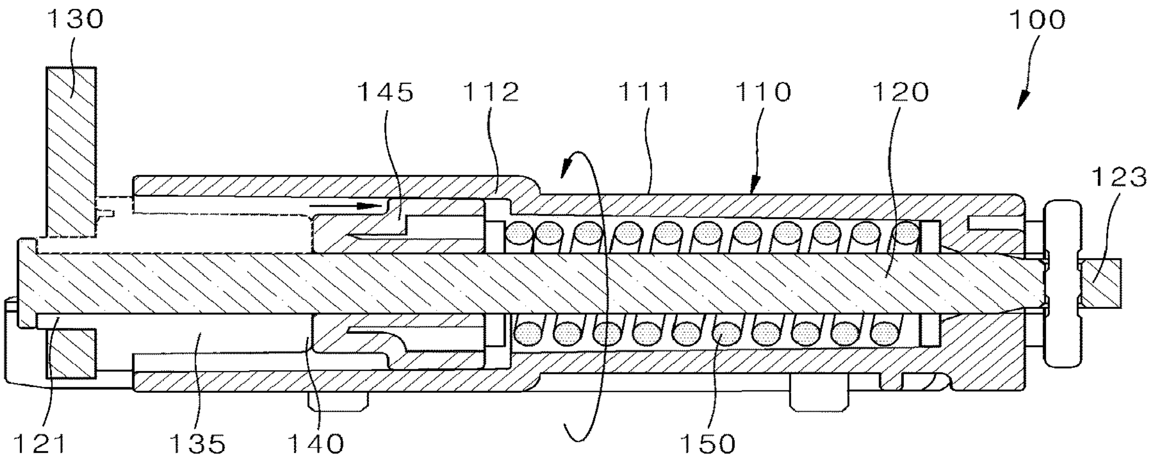
Figure 9:
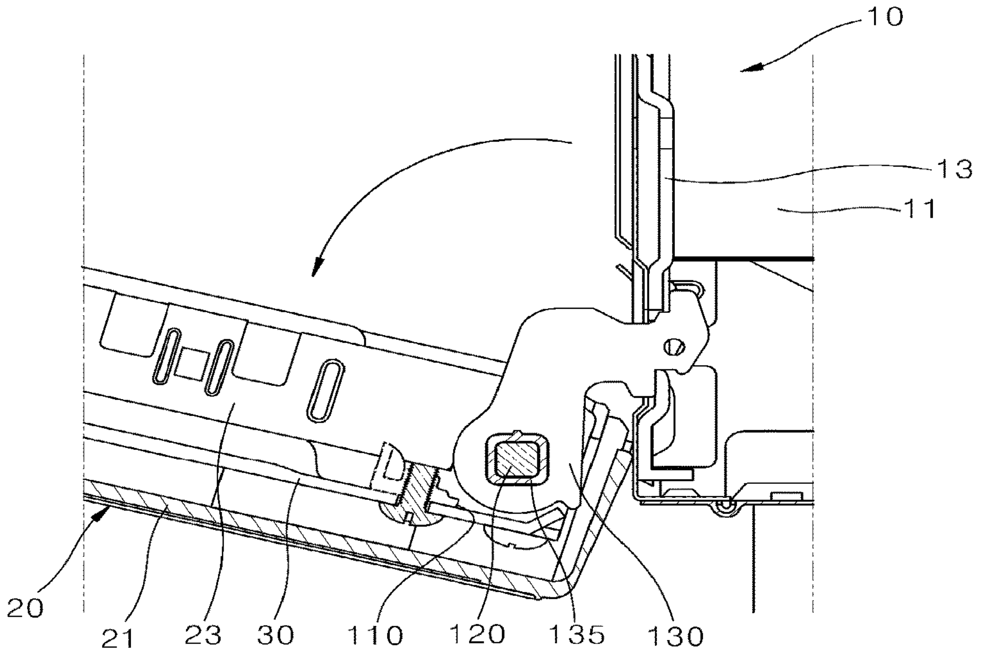

FIGS. 7 to 9 are cross-sectional views showing a relationship between an opening angle of a door and an operating state of a hinge assembly.

Hereinafter, an operation of the hinge assembly according to one embodiment of the present invention will be described with reference to FIGS. 6 to 9.

As shown in FIGS. 6 and 7, when the door 20 is closing the receiving space 12, that is, when the opening angle of the door 20 is 0°, the movable cam 140 may be disposed at a location where it has moved the furthest in the fourth direction.

In such state, the first force may act predominantly on the movable cam 140. That is, the pressing portion 150 is applying the first force to the movable portions 140 and 145, and accordingly, the movable cam 140 receives the force that moves the movable cam 140 in the fourth direction. As a result, the door 20 may maintain the state of closing the receiving space 12.

When the user pulls the door 20 forward, the door 20 may pivot in the first direction, as shown in FIGS. 6 and 8. When the door 20 pivots in the first direction as such, the casing 110 installed on the door 20 may rotate together with the door 20. Additionally, the movable cam 140 may rotate in the first direction together with the casing 110.

In this regard, the movable cam 140 may rotate while being engaged with the fixed cam 135. Such a movable cam 140 may rotate along the cam curve of the fixed cam 135 engaged with the movable cam 140 and may move in the third direction.

That is, a force that moves the movable portions 140 and 145 in the third direction may be applied to the movable portions 140 and 145 by the rotation of the movable cam 140 performed in the state in which the fixed cam 135 and the movable cam 140 are engaged with each other. Hereinafter, the force that moves the movable portions 140 and 145 in the third direction will be referred to as a "second force".

The second force applied by the fixed cam 135, that is, the fixed portions 130 and 135, may act as a force to resist the first force applied by the pressing portion 150. When such a second force is greater than the first force, the movable portions 140 and 145 may move in the third direction and the door 20 may pivot in the first direction.

The second force may correspond to a sum of a force applied by a self-weight of the door 20 pivoting in the first direction and a friction force occurring between the movable portions 140 and 145 and the fixed portions 130 and 135. That is to say, the second force may correspond to a sum of a moment applied by the door 20 and a friction force occurring on a surface where the movable cam 140 and the fixed cam 135 are engaged with each other.

The moment applied by the door 20 may vary depending on the opening angle of the door 20. That is to say, the moment acts weakly at the beginning of opening when the door 20 begins to pivot in the first direction, but as the opening angle of door 20 increases, the moment gradually acts stronger.

Additionally, the first force applied by the pressing portion 150 may also vary depending on the opening angle of the door 20. As the opening angle of the door 20 increases, the locations of the movable portions 140 and 145 change further toward the third direction. Accordingly, an amount of change in a length of the pressing portion 150 increases, and a magnitude of the elastic force provided by the pressing portion 150 also increases. That is to say, the first force acts weakly at the beginning of opening when the door 20 begins to pivot in the first direction, but as the opening angle of the door 20 increases, the first force gradually acts stronger.

Additionally, the friction force occurring between the movable portions 140 and 145 and the fixed portions 130 and 135 may also vary depending on the opening angle of the door 20. As described above, as the opening angle of the door 20 increases, a magnitude of the first force and a magnitude of the second force become greater. As the magnitudes of the first force and the second force acting in opposite directions toward the surface where the movable cam 140 and the fixed cam 135 are engaged with each other increase, a force acting on the surface where the movable cam 140 and the fixed cam 135 are engaged with each other increases.

As such, as the force acting on the surface where the movable cam 140 and the fixed cam 135 are engaged with each other increases, the magnitude of the friction force occurring between the movable portions 140 and 145 and the fixed portions 130 and 135 also increases. That is, at the beginning of opening when the door 20 begins to pivot in the first direction, the friction force occurring between the movable portions 140 and 145 and the fixed portions 130 and 135 acts weakly, but as the opening angle of the door 20 increases, the friction force occurring between the movable portions 140 and 145 and the fixed portions 130 and 135 gradually acts stronger.

According to the present embodiment, the operations of the door 20 and the hinge assembly 100 may vary depending on the opening angle of the door 20 when a manipulation of a user of pivoting the door 20 to open or close the door 20 stops.

That is to say, the operations of the door 20 and the hinge assembly 100 may vary depending on whether the pivoting manipulation of the user is stopped when the opening angle of the door 20 is smaller than a set angle, or whether the pivoting manipulation of the user is stopped when the opening angle of the door 20 is equal to or greater than the set angle.

In the present embodiment, the set angle is illustrated as 30°, but the present invention is not limited thereto. The set angle may be appropriately selected to be a value selected by taking into account a type or a size of the home appliance, a size or a weight of the door, and the like.

As shown in FIG. 8, when the force that pivots the door 20 in the first direction is released when the opening angle of the door 20 is smaller than the set angle, the door 20 may pivot in the second direction, which is opposite to the first direction, and return to an original location thereof to return to the state of closing the receiving space 12.

The hinge assembly 100 in the present embodiment may be provided such that when the opening angle of the door 20 is smaller than the set angle, the magnitude of the second force is smaller than the magnitude of the first force.

When the pivoting of the door 20 in the first direction occurs, the force applied by the self-weight of the door 20, that is, the moment applied by the door 20, is applied to the movable portions 140 and 145 via the fixed portions 130 and 135, more specifically, the fixed cam 135. In this regard, the moment transmitted to the fixed portions 130 and 135 is converted into the force that moves the movable portions 140 and 145 in the third direction and is applied to the movable portions 140 and 145.

At the same time, the second force by the pressing portion 150 is also applied to the movable portions 140 and 145. That is, at one side of the movable portions 140 and 145, the force that moves the movable portions 140 and 145 in the third direction acts, and at the other side of the movable portions 140 and 145, the force that moves the movable portions 140 and 145 in the fourth direction acts. In addition, the friction force may occur on the surface where the movable cam 140 and the fixed cam 135 are engaged with each other.

According to the present embodiment, when the opening angle of the door 20 is smaller than the set angle, the pressing portion 150 may push the movable portions 140 and 145 in the fourth direction with a force greater than the sum of the moment applied by the door 20 and the friction force occurring on the surface where the movable cam 140 and the fixed cam 135 are engaged with each other.

Accordingly, the movable portions 140 and 145, which have moved in the third direction, may move in the fourth direction and return to original locations thereof, and along with the movable portions 140 and 145, the casing 110 and the door 20 may also rotate and pivot in the second direction and return to original locations thereof.

That is to say, the home appliance in the present embodiment may realize an auto-closing function that automatically pivots the door 20 to close the receiving space 12 when the opening angle of the door 20 is smaller than the set angle.

As shown in FIGS. 8 and 9, when the opening angle of the door 20 is equal to or greater than the set angle and the force that pivots the door 20 in the first direction is released, the door 20 may remain stationary at a location where the force is released.

That is to say, when the opening angle of the door 20 is equal to or greater than the set angle, the location of the door 20 may be fixed at a location where the user stops pivoting the door 20.

The hinge assembly 100 in the present embodiment may be provided such that, when the opening angle of the door 20 is equal to or greater than the set angle, an absolute value of a magnitude of a resultant force of the first force and the second force is equal to or smaller than an absolute value of the magnitude of the friction force occurring between the movable portions 140 and 145 and the fixed portions 130 and 135.

That is to say, when the opening angle of the door 20 is equal to or greater than the set angle, a force to suppress the movement of the movable portions 140 and 145 may act stronger than the force to move the movable portions 140 and 145 in the third or fourth direction.

As described above, as the opening angle of the door 20 increases, a magnitude of the elastic force by the fixed portions 130 and 135 and a magnitude of the moment by the self-weight of the door 20 increase, and accordingly, the magnitude of the friction force occurring between the movable portions 140 and 145 and the fixed portions 130 and 135 increases.

As the magnitude of the force to move the movable portions 140 and 145 in the third direction increases, the magnitude of the first force acting in the opposite direction increases, so that, even when the opening angle of the door 20 increases, an actual force applied to the movable portions 140 and 145 does not change significantly. In comparison, the magnitude of the friction force occurring between the movable portions 140 and 145 and the fixed portions 130 and 135 increases as the opening angle of the door 20 increases.

Accordingly, when the opening angle of the door 20 is equal to or greater than the set angle, the friction force occurring between the movable portions 140 and 145 and the fixed portions 130 and 135 acts stronger than the force to move the movable portions 140 and 145 in the third or fourth direction. As a result, when the opening angle of the door 20 is equal to or greater than the set angle, the location of the door 20 may be fixed at the location where the user stops pivoting the door 20.

The home appliance in the present embodiment including the hinge assembly 100 and the door 20 operated as described above effectively suppresses rapid pivoting of the door 20 when the door 20 is opened, thereby reducing anxiety of the user and increasing satisfaction of the user.

Additionally, the home appliance in the present embodiment may provide further improved convenience by allowing the door 20 to be fixed at the specific location where the user stops pivoting the door 20.

Additionally, the home appliance in the present embodiment may provide the auto-closing function in which the door 20 automatically closes when the opening angle of the door 20 is smaller than the set angle. The home appliance in the present embodiment may effectively improve stability and the convenience of the home appliance by allowing the door 20 to be closed with high reliability even when the user does not properly close the door 20.

[Installation Structure of Hinge Assembly]

Figure 10:
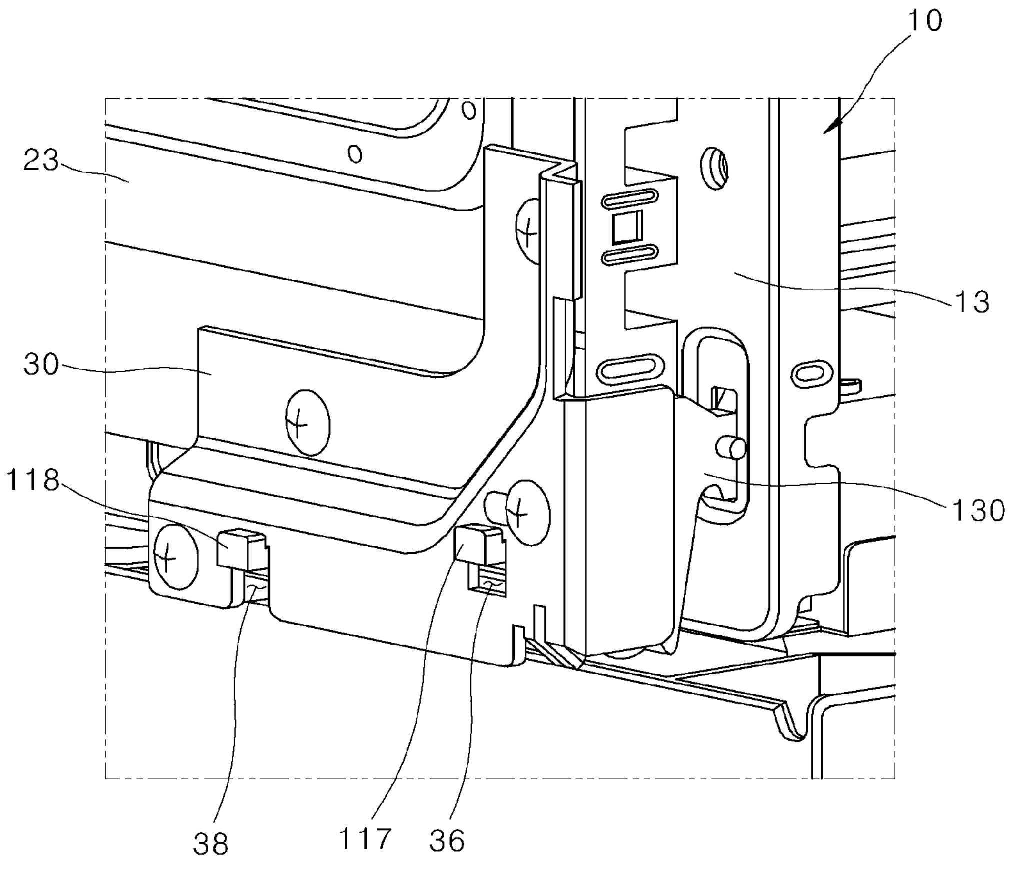
FIG. 10 is a front perspective view showing an installation state of a hinge assembly according to an embodiment of the present invention.
Figure 11:
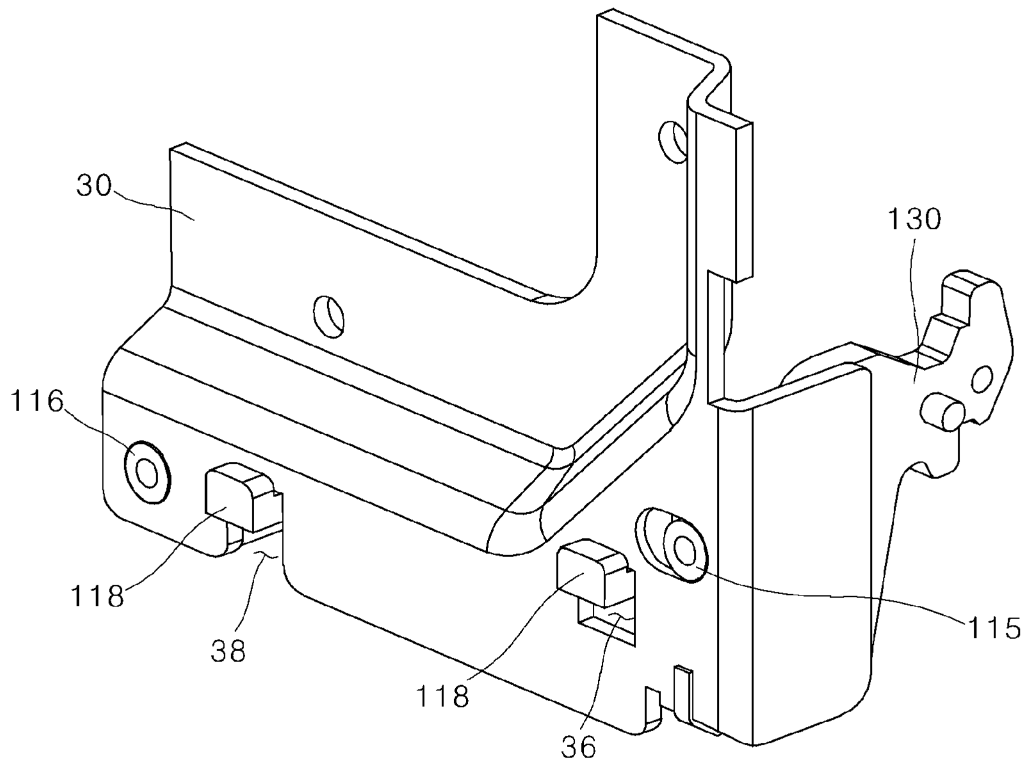
FIG. 11 is a front perspective view showing a bracket and a hinge assembly shown in FIG. 10 separated from each other.
Figure 12:
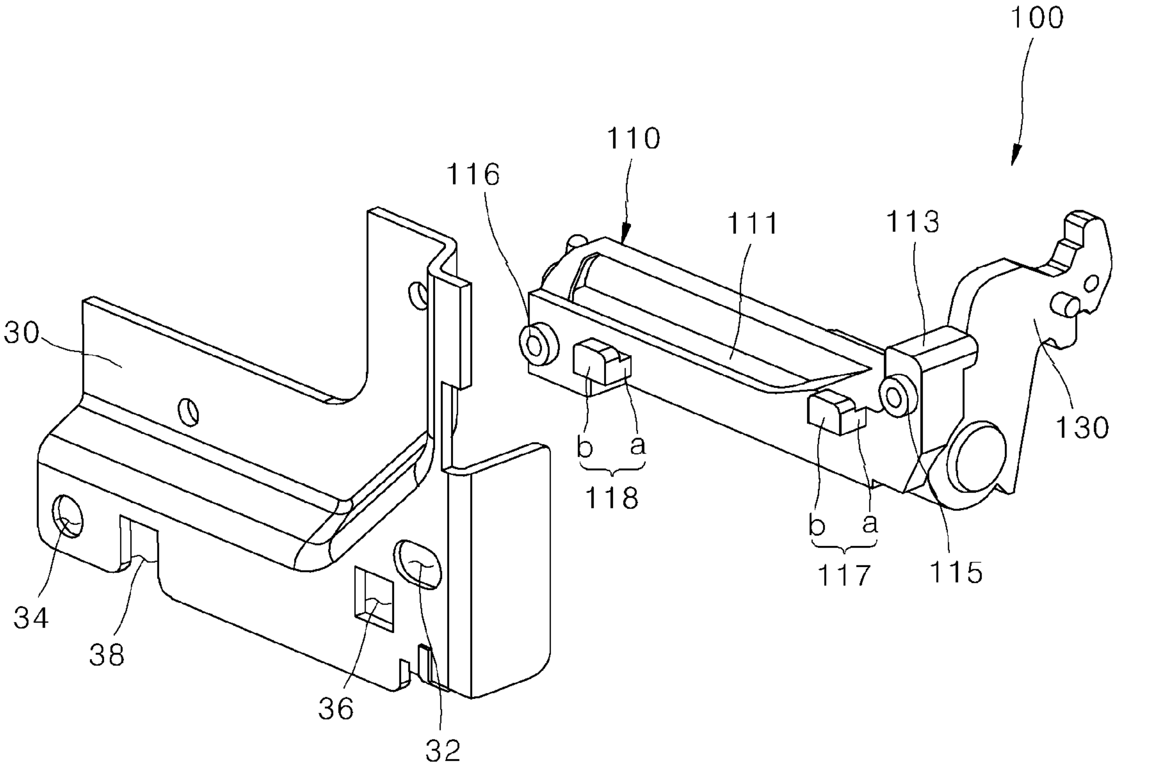
FIG. 12 is an exploded perspective view showing a disassembled state of a bracket and a hinge assembly shown in FIG. 11.
Figure 13:
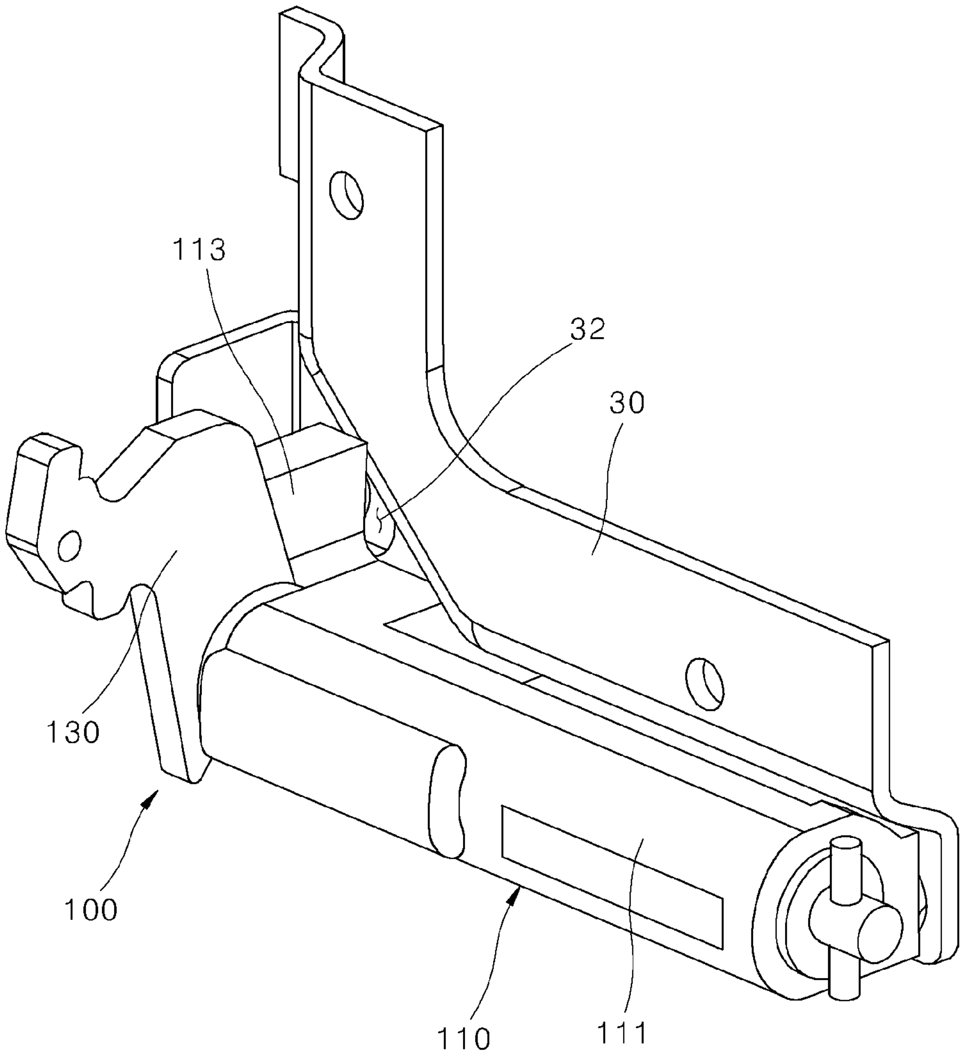
FIG. 13 is a rear perspective view showing rear surfaces of a bracket and a hinge assembly shown in FIG. 11.
Figure 14:
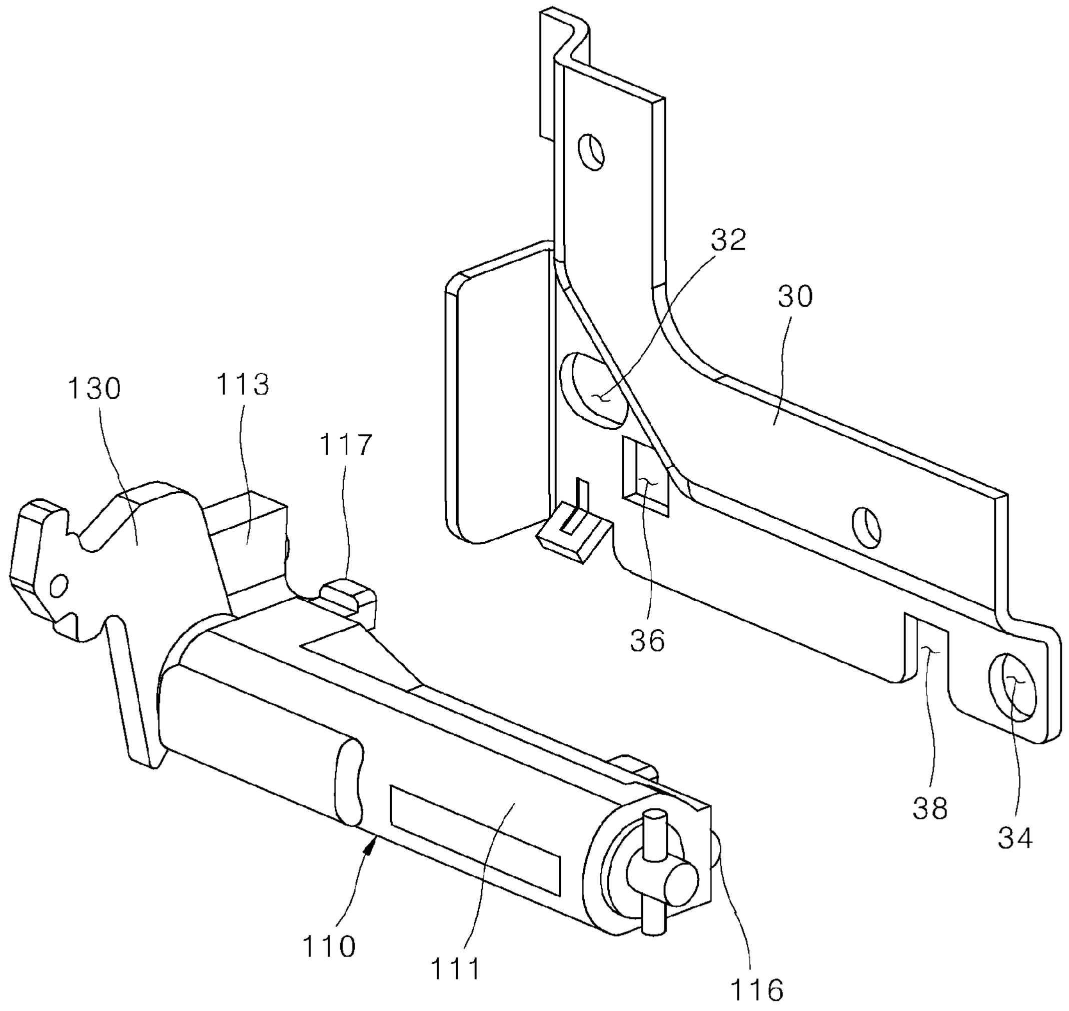
FIG. 14 is an exploded perspective view showing a disassembled state of a bracket and a hinge assembly shown in FIG. 13.

FIG. 10 is a front perspective view showing an installation state of a hinge assembly according to an embodiment of the present invention, FIG. 11 is a front perspective view showing a bracket and a hinge assembly shown in FIG. 10 separated from each other, and FIG. 12 is an exploded perspective view showing a disassembled state of a bracket and a hinge assembly shown in FIG. 11. Additionally, FIG. 13 is a rear perspective view showing rear surfaces of a bracket and a hinge assembly shown in FIG. 11, FIG. 14 is an exploded perspective view showing a disassembled state of a bracket and a hinge assembly shown in FIG. 13, and FIGS. 15 to 18 are side cross-sectional views showing a coupling structure between a bracket and a hinge assembly shown in FIG. 11.

Hereinafter, the installation structure of the hinge assembly according to one embodiment of the present invention will be described with reference to FIGS. 10 to 18.

Referring to FIGS. 10 to 12, the hinge assembly 100 may be installed on the door 20 by being coupled to the door frame 23. The coupling of the hinge assembly 100 and the door frame 23 may be achieved via the bracket 30.

The bracket 30 may be coupled to the casing 110 and the door frame 23 to couple the casing 110 to the door 20. Such a bracket 30 may be disposed to face the door frame 23 in the front and rear direction, and may be disposed in an area adjacent to the lower end of the door frame 23.

In the present embodiment, the bracket 30 is illustrated as being disposed in front of the door frame 23 and in an area adjacent to a lower edge of the door frame 23. As such a bracket 30 is disposed in an inconspicuous area between the door panel 21 and the door frame 23, the bracket 30 may be involved in the coupling of the door 20 and the hinge assembly 100 without damaging aesthetics of the home appliance.

The bracket 30 may cover a portion of a front surface of the door frame 23 at the lower edge of the door frame 23 and be coupled to the door frame 23. A portion of such a bracket 30 may protrude downwardly of the door frame 23, and the hinge assembly 100 may be coupled to such a protruding portion.

As shown in FIGS. 11 to 14, the casing 110 may be coupled to the bracket 30. The casing 110 may include a casing main body 111. The casing main body 111 may occupy most of an area of the casing 110, and various components constituting the hinge assembly 100, such as the shaft 120, the movable portions 140 and 145, and the pressing portion 150, may be accommodated inside the casing main body 111.

The casing 110 may further include a protrusion 113. The protrusion 113 may be formed in a shape that protrudes from the casing main body 111 in the vertical or lateral direction. In the present embodiment, the protrusion 113 is illustrated as being formed in a shape of a protrusion protruding upward from the casing main body 111.

The protrusion 113 may be formed to protrude upward from one end of the casing main body 111. Such a protrusion 113 may provide the casing 110 with a coupling surface necessary to couple the casing 110 to the bracket 30.

To secure the coupling surface necessary to couple the casing 110 to the bracket 30 on the casing 110, at least a portion of the casing 110 must protrude from the casing main body 111. This is because the casing main body 111 is filled with the components such as the shaft 120, the movable portions 140 and 145, and the pressing portion 150.

When the protrusion 113 protrudes downward from the casing main body 111, a length at which the bracket 30 protrudes downwardly of the door frame 23 must be correspondingly greater. However, in a limited space between the door frame 23 and the door panel 21, it is not easy to secure a space for the increase in the length.

In addition, when the protrusion 113 protrudes to one side from the casing main body 111, the bracket 30 must protrude to one side from the door frame 23. However, it is also not easy to secure a space for the protrusion inside the door 20.

Considering the above, it is preferable that the protrusion 113 is formed in the shape that protrudes from the casing main body 111 to secure the coupling surface necessary to couple the casing 110 to the bracket 30 at one side of the casing 110.

As described above, the protrusion 113 protruding upward from the casing main body 111 may be disposed to face the hinge arm 130 in the front and rear direction.

According to the present embodiment, the hinge arm 130 may be disposed at the rear of the protrusion 113, and may interfere with the protrusion 113 when the hinge assembly 100 rotates in the second direction to regulate the rotation and the pivoting in the second direction of the hinge assembly 100 and the door 20. That is, the protrusion 113 and the hinge arm 130 may provide a stopper function to limit excessive pivoting of the door 20 pivoting in the second direction.

On the casing 110, fastening bosses 115 and 116 may be disposed. According to the present embodiment, the coupling of the bracket 30 and the casing 110 may be achieved by a fastening member s such as a screw that is fastened to the bracket 30 and the casing 110. The fastening bosses 115 and 116 may be disposed on the casing 110 so as to be coupled to the fastening member s that extends through the bracket 30.

The plurality of fastening bosses 115 and 116 may be disposed on the casing 110. In the present embodiment, it is illustrated that the pair of fastening bosses 115 and 116 are disposed on the casing 110. Accordingly, the pair of fastening bosses 115 and 116 may be arranged to be spaced apart from each other in the lateral direction with the casing main body 111 interposed therebetween.

For example, at least one (hereinafter, referred to as a "first fastening boss") of the plurality of fastening bosses 115 and 116 may be disposed at one side of the casing main body 111, and may be disposed on the protrusion 113. Additionally, at least the other (hereinafter, referred to as a "second fastening boss") of the plurality of fastening bosses 115 and 116 may be disposed at the other side of the casing main body 111. At a place where it is difficult to secure a space for placing the fastening boss, that is, at one side of the casing 110, the first fastening boss may be disposed on the protrusion 113. Further, at a place where it is relatively easy to secure the space for placing the fastening boss, that is, at the other side of the casing 110, the second fastening boss 116 may be disposed at a portion protruding from the casing main body 111 to the other side.

In response thereto, a plurality of fastening holes 32 and 34 may be defined in the bracket 30. Each of the fastening holes 32 and 34 may be defined to allow the fastening member s to pass therethrough, and may be defined at locations so as to be respectively connected to the fastening bosses 115 and 116 in the front and rear direction.

For example, in the bracket 30, the pair of fastening holes 32 and 34 may be defined to be spaced apart from each other in the lateral direction. The pair of fastening holes 32 and 34 may be spaced apart from each other by a distance corresponding to a separation distance between the pair of fastening bosses 115 and 116.

Figure 15:
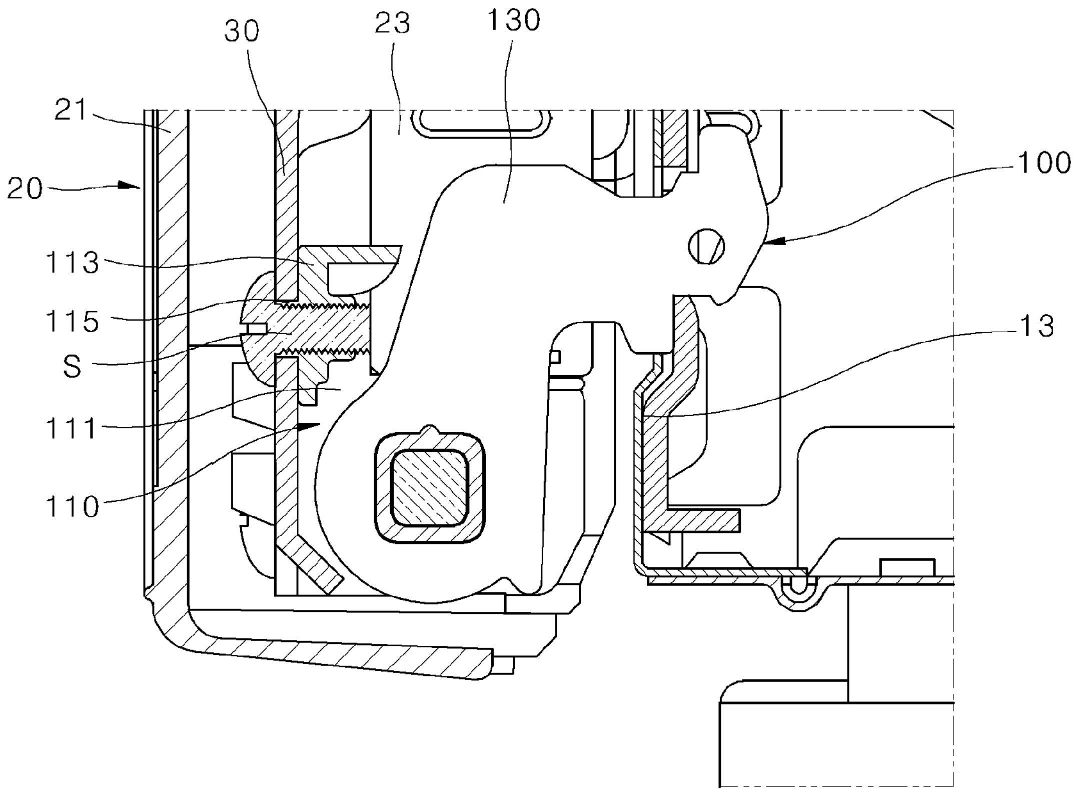
FIGS. 15 to 18 are side cross-sectional views showing a coupling structure between a bracket and a hinge assembly shown in FIG. 11.
Figure 16:
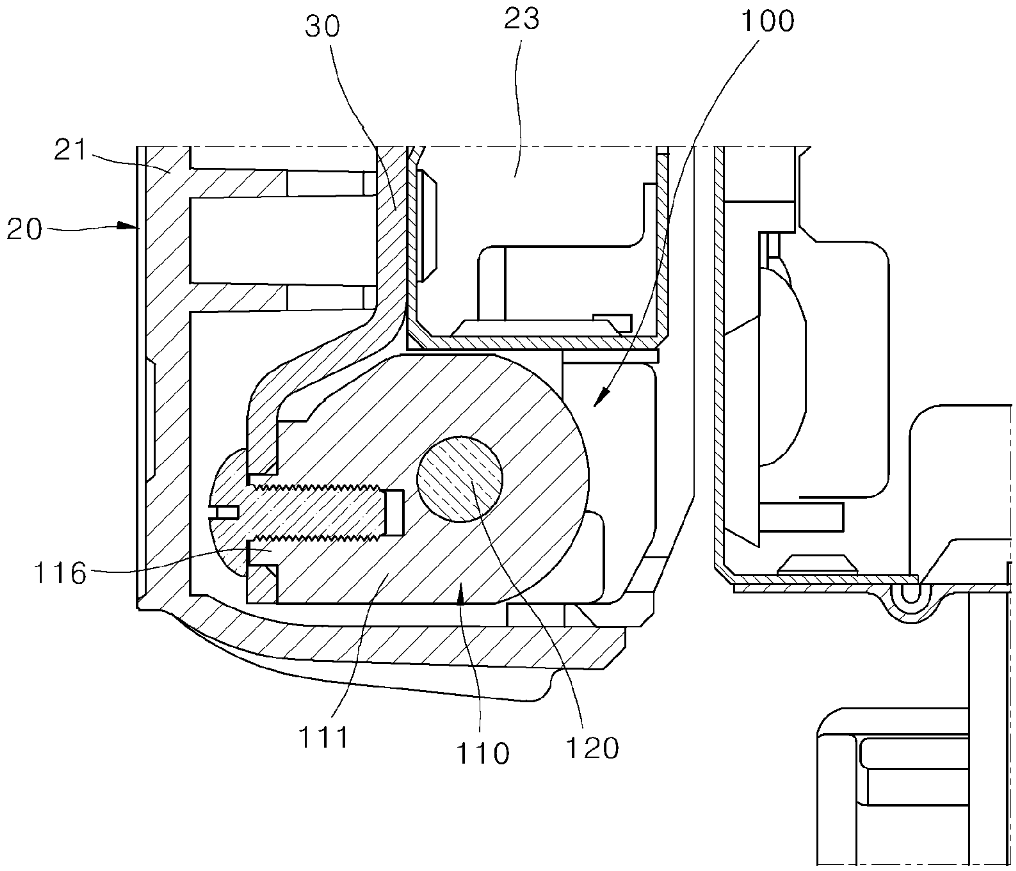

Referring to FIGS. 12, 15, and 16, each of the fastening holes 32 and 34 may be defined to extend through the bracket 30 in the front and rear direction. In addition, the fastening members s may be coupled to the fastening bosses 115 and 116 by extending through the bracket 30 via the fastening holes 32 and 34, respectively.

According to the present embodiment, the coupling of the casing 110 and the bracket 30 may be achieved at a plurality of points via the fastening bosses 115 and 116 disposed at both sides of the casing 110. Accordingly, the hinge assembly 100 whose both sides in the lateral direction are coupled to the bracket 30 may be stably coupled to the door 20.

In addition, according to the present embodiment, at least one 32 (hereinafter, referred to as a "first fastening hole") of the pair of fastening holes 32 and 34 may be defined in a shape different from that of the other 34 (hereinafter, referred to as a "second fastening hole").

As an example, the first fastening hole 32 may be defined in a shape of a slot hole with a great length in the lateral direction. The length in the lateral direction of such a first fastening hole 32 may be set greater than lengths in the lateral direction of the fastening bosses 115 and 116. The first fastening hole 32 defined as such may contribute to smooth installation of the hinge assembly 100 by alleviating an influence of tolerances of the fastening bosses 115 and 116 or the fastening holes 32 and 34.

The casing 110 may further include hook members 117 and 118, as shown in FIGS. 10 to 14. The hook members 117 and 118 may protrude from the casing main body 111 and may be fitted into the bracket 30. As an example, each of the hook members 117 and 118 may include a horizontal protrusion a and a vertical protrusion b.

The horizontal protrusion a may be formed in a shape of a protrusion protruding from the casing main body 111. Such a horizontal protrusion a may protrude forward from a front surface of the casing main body 111. A front end of the horizontal protrusion a may protrude forwardly of the bracket 30 through each of hook holes 36 and 38.

The vertical protrusion b may protrude upward from the front end of the horizontal protrusion a. As an example, the hook members 117 and 118 may be formed in a shape in which the horizontal protrusion a and the vertical protrusion b are connected to each other in an "L" shape. The vertical protrusion b may be disposed to face the bracket 30 on a front side of the bracket 30, and a rearward movement of the hook members 117 and 118 may be regulated by interference that occurs between the vertical protrusion b and the bracket 30.

On the casing 110, the plurality of hook members 117 and 118 may be disposed. In the present embodiment, it is illustrated that the number of hook members 117 and 118 corresponds to the number of fastening bosses 115 and 116, for example, the pair of hook members 117 and 118 are disposed on the casing 110.

Each of the hook members 117 and 118 may be disposed adjacent to each of the fastening bosses 115 and 116. For example, at least one (hereinafter, referred to as a "first hook member") of the plurality of hook members 117 and 118 may be disposed at a location adjacent to the first fastening boss 115, and at least the other (hereinafter, referred to as a "second hook member") of the plurality of hook members 117 and 118 may be disposed at a location adjacent to the second fastening boss 116.

Each of the hook members 117 and 118 may be disposed closer to each of the fastening bosses 115 and 116 than to the other of the hook members 117 and 118. For example, the first hook member 117 may be disposed closer to the first fastening boss 115 than to the second hook member 118, and the second hook member 118 may be disposed closer to the second fastening boss 116 than to the first hook member 117.

That is to say, a distance between the first hook member 117 and the first fastening boss 115 and a distance between the second hook member 118 and the second fastening boss 116 may be smaller than a distance between the first hook member 117 and the second hook member 118.

As an example, the first hook member 117 may be disposed on the protrusion 113 or may be disposed between the casing main body 111 and the protrusion 113. That is, the first hook member 117 may be disposed adjacent to the protrusion 113 and the first fastening boss 115, but at least higher than the casing main body 111. In the present embodiment, the first hook member 117 is illustrated as being disposed on the protrusion 113.

The first hook member 117 disposed as such may be coupled to the bracket 30 at the location very close to the first fastening boss 115.

According to the present embodiment, the hook members 117 and 118 may be disposed between the pair of fastening bosses 115 and 116. For example, the pair of hook members 117 and 118 may be disposed to be spaced apart from each other by a predetermined distance in the lateral direction, and the pair of fastening bosses 115 and 116 may be disposed to be spaced apart from each other in the lateral direction with the hook members 117 and 118 interposed therebetween.

The fastening bosses 115 and 116 need to be disposed at a location deviating from the casing main body 111 in the lateral direction or in the vertical direction to secure the insertion space for the fastening member s. In comparison, the hook members 117 and 118 do not need to be disposed at the locations deviating from the casing main body 111 in the lateral direction or in the vertical direction. Therefore, the hook members 117 and 118 may be disposed at locations that do not protrude further in the lateral direction or in the vertical direction than the casing main body 111 and the protrusion 113.

In consideration of the above, the hook members 117 and 118 may be disposed between the pair of fastening bosses 115 and 116, thereby contributing to the coupling of the casing 110 and the bracket 30 while preventing a length in the lateral direction or the vertical direction of the casing 110 from being unnecessarily increased.

Each of the hook members 117 and 118 may be fitted into the bracket 30. That is, the hook members 117 and 118 may be detachably coupled to the bracket 30 without the fastening member s such as the screw.

To this end, the bracket 30 may include the plurality of hook holes 36 and 38. Each of the hook holes 36 and 38 may be defined to allow each of the hook members 117 and 118 to pass therethrough, and may be defined at a location to be connected to each of the hook members 117 and 118 in the front and rear direction.

For example, in the bracket 30, the pair of hook holes 36 and 38 may be defined to be spaced apart from each other in the lateral direction, but may be defined to be spaced apart from each other by a distance corresponding to the distance between the pair of hook members 117 and 118.

Figure 17:
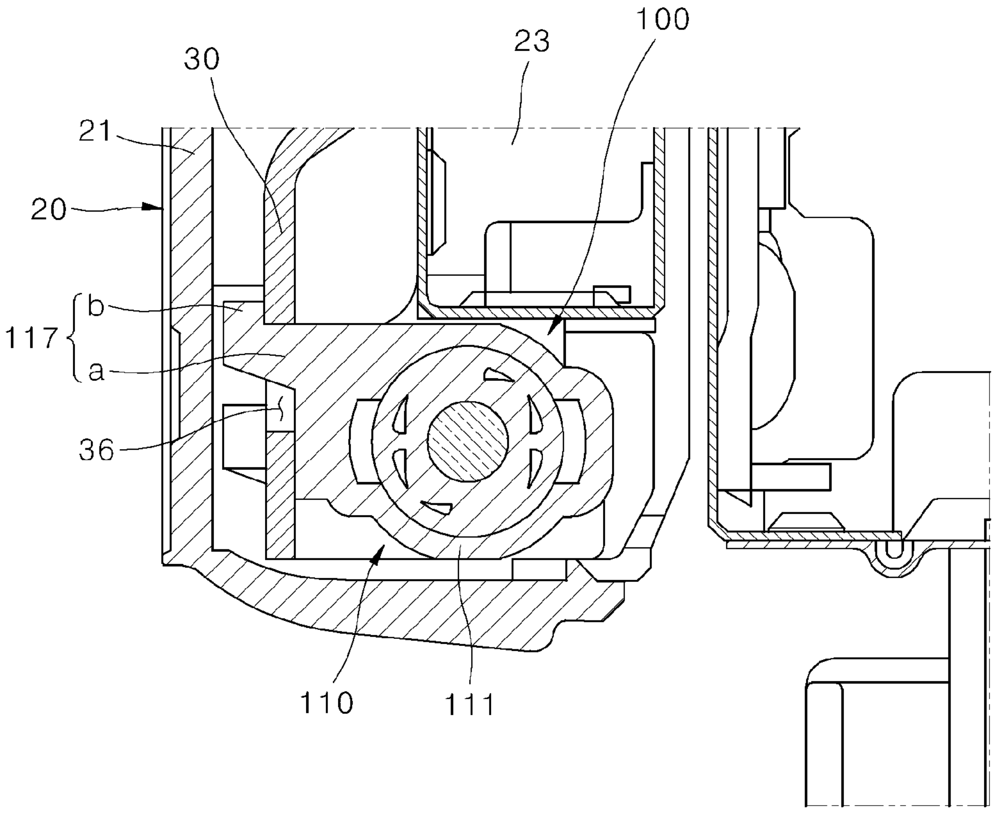
Figure 18:
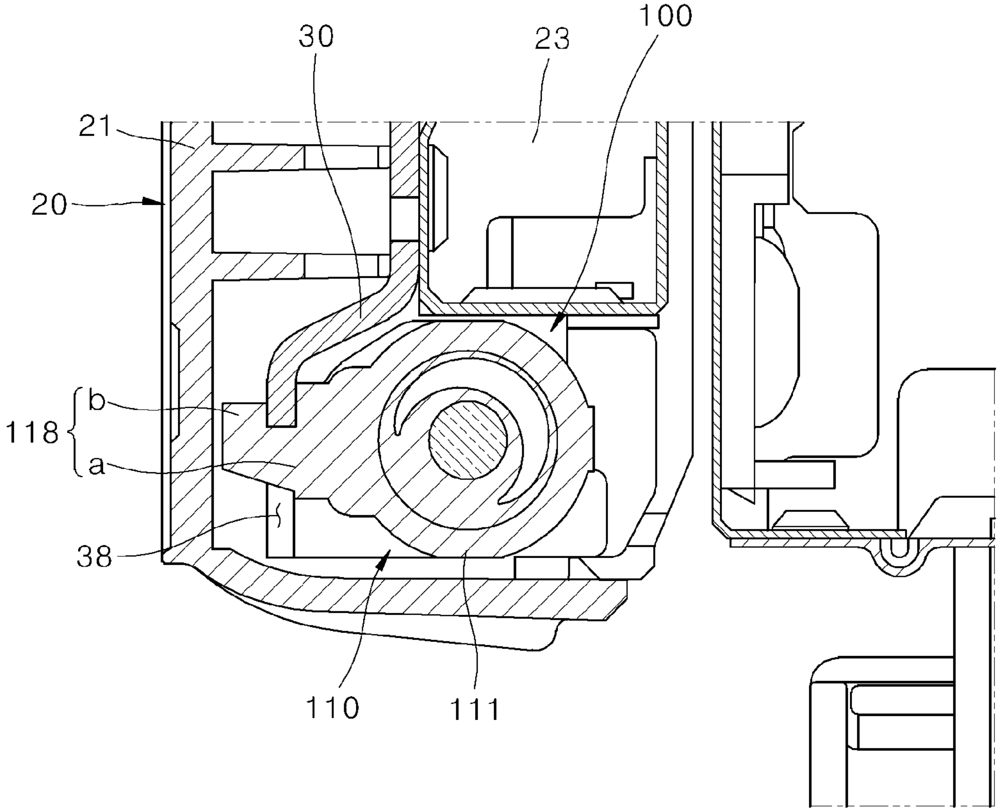

Referring to FIGS. 12, 17, and 18, each of the hook holes 36 and 38 may be formed to extend through the bracket 30 in the front and rear direction. In addition, the hook members 117 and 118 may pass through the bracket 30 via the hook holes 36 and 38, respectively, and may be inserted into the bracket 30.

According to the present embodiment, the casing 110 may be inserted into the bracket 30 at a plurality of points via the plurality of hook members 117 and 118 disposed in the lateral direction. Additionally, the coupling of the casing 110 and the bracket 30 may be achieved at a plurality of points via the plurality of fastening bosses 115 and 116 and hook members 117 and 118 disposed on the casing 110.

The hook members 117 and 118 may be detachably inserted into the bracket 30. For example, when the hook members 117 and 118 are inserted into the bracket 30 with the front surface of the casing 110 tilted slightly downward relative to the bracket 30, the hook members 117 and 118 may be easily inserted into the bracket 30 and may be detachably coupled to the bracket 30.

The hook members 117 and 118 inserted into the bracket 30 as such may easily and quickly fix the casing 110 to the bracket 30 and effectively guide a fastening work location for the coupling of the casing 110 and the bracket 30.

That is to say, the fastening bosses 115 and 116 and the fastening holes 32 and 34 required for fastening work using the fastening member s may be effectively aligned via the hook members 117 and 118 that are easily and quickly inserted into the bracket 30. In addition, the hook members 117 and 118 may also provide a function of temporarily fixing the casing 110 to maintain the alignment of the fastening bosses 115 and 116 and the fastening holes 32 and 34.

In one example, according to the present embodiment, the first hook member 117 disposed adjacent to the first fastening boss 115 may be disposed at a vertical level higher than that of the second hook member 118 disposed adjacent to the second fastening boss 116. Accordingly, the hook hole (referred to as the "first hook hole") 36 paired with the first hook member 117 may be disposed at a vertical level higher than that of the hook hole (referred to as the "second hook hole") 38 paired with the second hook member 118.

At least one of the pair of hook holes 36 and 38 may be defined in a shape different from that of the other hook hole. That is, the first hook hole 36 and the second hook hole 38 may be defined in different shapes.

As an example, one of the first hook hole 36 and the second hook hole 38 may be defined to be open downwards in the bracket 30. For example, among the pair of hook holes 36 and 38, the first hook hole 36, which is defined at the relatively higher vertical level, may be defined to be spaced apart from a lower end of the bracket 30. In addition, among the pair of hook holes 36 and 38, the second hook hole 38, which is defined at the relatively lower vertical level, may be defined to be open downwards in the bracket 30 via the lower end of the bracket 30.

Accordingly, the hook members 117 and 118 may be inserted into the bracket 30 in a scheme of pushing the first hook member 117 forward into the first hook hole 36 with the other side of the casing 110 tilted downward relative to the bracket 30, and then pushing the second hook member 118 located beneath the second hook hole 38 upward into the second hook hole 38.

That is to say, the hook members 117 and 118 may be easily and quickly coupled to the bracket 30 by simply inserting one of the hook members 117 and 118 into the bracket 30 and then pushing the other upwards.

The hook members 117 and 118, which are coupled to the bracket 30 as described above, may be involved in the coupling of the fastening bosses 115 and 116 and the bracket 30 at the locations adjacent to the fastening bosses 115 and 116. Such hook members 117 and 118 may contribute to allowing a force applied to coupling portions between the casing 110 and the bracket 30 not to be concentrated only on coupling portions between the fastening bosses 115 and 116 and the bracket 30, but also to be distributed to coupling portions between the hook members 117 and 118 and the bracket 30.

As an example, the casing 110 may be made of a plastic material. Preferably, the casing 110 may be formed as a plastic injection-molded product. In addition, the fixed cam and the movable cam may also be formed as plastic injection-molded products.

As another example, the casing may be made of a metal material. In addition, the fixed cam and the movable cam may also be made of the metal material. when the casing, the fixed cam, and the movable cam are made of the metal material, strengths thereof may increase, but an operating noise of the hinge assembly 100 may increase.

In comparison, when the casing, the fixed cam, and the movable cam are made of the plastic material, the operating noise of the hinge assembly 100 relatively decreases, but the strengths thereof inevitably decrease.

In the present embodiment, the casing 110 is illustrated as being made of the plastic material. The protrusion 113, the structure protruding from the casing main body 111, is more vulnerable to damage than other portions of the casing 110. Therefore, when an external force is applied intensively to the coupling portion between the first fastening boss 115 and the bracket 30, a risk of damage to the protrusion 113 increases significantly.

The hook members 117 and 118, especially the first hook member 117 adjacent to the first fastening boss 115, may distribute the external force applied to the coupling portion between the first fastening boss 115 and the bracket 30 to the coupling portion between the first hook member 117 and the bracket 30. The hook members 117 and 118, including such a first hook member 117, may effectively reduce the risk of damage to the protrusion 113.

Additionally, the first hook member 117 may serve as a support structure to maintain the one side of the casing 110 coupled to the bracket 30. According to the present embodiment, even when the protrusion 113 is damaged and the coupling portion between the first fastening boss 115 and the bracket 30 is removed from the casing 110, the first hook member 117 may stably maintain the state of being coupled with the bracket 30.

Such a first hook member 117 serves as the support structure to support the casing 110 as described above, thereby contributing to ensuring that the casing 110 is stably coupled to the bracket 30 even when the protrusion 113 is damaged.

The present invention is to provide a home appliance with an improved structure to prevent rapid pivoting of a door.

In addition, the present invention is to provide a home appliance with an improved structure such that a door may be fixed at a specific location desired by a user.

In addition, the present invention is to provide a home appliance with an improved structure such that a hinge assembly may be assembled easily and quickly.

In addition, the present invention is to provide a home appliance with an improved structure such that an installation state of a hinge assembly may be maintained stably.

The invention is specified by the independent claim. Preferred embodiments are defined by the dependent claims. A home appliance, which is an embodiment of the present invention to achieve the above purpose, includes a hinge assembly that generates a force to resist a force applied by a self-weight of a door and pivotably connects the door to a main body.

The hinge assembly may include a movable portion that rotates in association with the pivoting of the door, a fixed portion that receives a force applied by a self-weight of the door and converts the received force into a force to move the movable portion in one direction, and a pressing portion that generates an elastic force to move the movable portion in the other direction.

In addition, another embodiment of the present invention includes each fastening boss coupled to a bracket via a fastening member, and each hook member disposed adjacent to each fastening boss and inserted into the bracket, and a hinge assembly is coupled to the bracket via the plurality of fastening bosses and the plurality of hook members disposed on a casing.

A home appliance according to one aspect of the present invention includes a main body having a receiving space with an open front surface defined therein, a door that is disposed at a front side of the main body, and pivots about a lower end thereof in a first direction to open the receiving space, and pivots about the lower end thereof in a second direction to close the receiving space, and a hinge assembly connected to the main body and the door.

The hinge assembly may include a movable portion that is rotatable in association with the pivoting of the door and is movable in a third direction and a fourth direction opposite to the third direction, and a fixed portion fixed to the main body and engaged with the movable portion rotating in the first direction to apply a second force to resist a first force to the movable portion.

The fixed portion may receive a force applied by a self-weight of the door pivoting in the first direction and apply the second force to the movable portion.

The present invention may further include a pressing portion that applies the first force for moving the movable portion in the fourth direction to the movable portion.

The pressing portion may include an elastic member that generates an elastic force to press the movable portion in the fourth direction.

The first force may be the elastic force generated from the elastic member.

A magnitude of the second force may increase as an opening angle of the door increases, the magnitude of the second force may be smaller than a magnitude of the first force when the opening angle of the door is smaller than a set angle, and the magnitude of the second force may be equal to or greater than the magnitude of the first force when the opening angle of the door is equal to or greater than the set angle.

The second force may correspond to a sum of the force applied by the self-weight of the door pivoting in the first direction and a friction force occurring between the movable portion and the fixed portion.

Each of the magnitude of the first force and a magnitude of the force applied by the self-weight of the door may increase as the opening angle of the door increases.

An absolute value of a magnitude of a resultant force, a sum of the first force and the second force, may be equal to or smaller than an absolute value of a magnitude of the friction force occurring between the movable portion and the fixed portion when the opening angle of the door is equal to or greater than the set angle.

The hinge assembly may further include a casing that accommodates the movable portion therein, and a bracket coupled to the casing to couple the casing to the door.

The casing may include a casing main body that movably accommodates the movable portion therein and is rotatably connected to the fixed portion, and each hook member protruding from the casing main body and fitted into the bracket.

The casing may have a plurality of fastening bosses coupled to fastening members extending through the bracket, respectively.

Each hook member may be disposed adjacent to each fastening boss, but may be disposed at a location closer to the fastening boss than to another hook member adjacent thereto.

The casing may further include a protrusion protruding from the casing main body in a vertical direction or a lateral direction.

At least one of the plurality of fastening bosses may be disposed on the protrusion.

At least one of the plurality of hook members may be disposed on the protrusion or between the casing main body and the protrusion.

The fixed portion may include a fixed cam engaged with the movable portion, and a hinge arm fixed to the main body and protruding toward the casing to support the fixed cam.

The protrusion may protrude upward from the casing main body and may be disposed to face the hinge arm in a front and rear direction, The hinge arm may interfere with the protrusion to regulate a rotation range of the casing.

The bracket may have a fastening hole defined therein allowing the fastening member to pass therethrough.

The fastening hole may include a pair of fastening holes defined to be spaced apart from each other in a lateral direction, and a length in the lateral direction of at least one of the pair of fastening holes may be greater than a length in the lateral direction of the fastening boss.

The bracket may have a hook hole defined therein allowing the hook member to pass therethrough.

The hook member may include a horizontal protrusion protruding from the casing main body such that an end thereof passes through the hook hole, and a vertical protrusion protruding upward from the end of the horizontal protrusion.

The hook hole may include a pair of hook holes defined to be spaced apart from each other in a lateral direction, and at least one of the pair of hook holes may be open downwards in the bracket.

One defined at a higher vertical level among the pair of hook holes may be defined to be spaced apart from a lower end of the bracket.

The other defined at a lower vertical level among the pair of hook holes may be open downwards in the bracket via the open lower end of the bracket.

The present invention prevents the door from pivoting, which is for the opening of the door, unless the manipulation of the user to open the door continues, thereby preventing the rapid pivoting of the door from occurring in advance.

In addition, the present invention may allow the door to be fixed at the specific location where the user stops pivoting the door, that is, at the specific location desired by the user, thereby providing the further improved convenience.

In addition, the home appliance in the present invention may provide the auto-closing function in which the door automatically closes when the opening angle of the door is smaller than the set angle. The present invention as described above may allow the door to be closed with high reliability even when the user does not close the door properly, thereby effectively improving the stability and the convenience of the home appliance.

In addition, the present invention may ensure that the fastening work for the coupling of the casing and the bracket and the temporary fixation of the casing are effectively achieved via the coupling of the hook member and the bracket, thereby making the assembly work of the hinge assembly easier and faster.

In addition, the present invention may not only suppress the occurrence of the damage to the protrusion, but also ensure that the casing is stably coupled to the bracket even when the protrusion is damaged, thereby allowing the hinge assembly to stably operate while stably maintaining the state of being installed on the door.

The present invention has been described with reference to the embodiment shown in the drawings, but this is merely illustrative. Those skilled in the art will understand that various modifications and other embodiments are possible. Therefore, the true technical protection scope of the present invention should be determined by the scope of the patent claims below.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance, comprising:

a main body having a receiving space with an open front defined therein;

a door disposed at a front side of the main body, and configured to pivot about a lower end thereof in a first direction to open the receiving space, or to pivot about the lower end thereof in a second direction to close the receiving space; and a hinge assembly connected to the main body and the door, wherein the hinge assembly includes:

a first cam configured to be rotatable in association with the pivoting of the door and to be movable in a third direction or a fourth direction opposite to the third direction;

a casing configured to accommodate the first cam therein, and a bracket coupled to the casing to couple the casing to the door; and a second cam coupled to the main body and configured to be engaged with the first cam such that when a first force generated by a biasing element is applied to the first cam and the first cam is rotating in the first direction, the second cam applies a second force to resist the first force to the first cam, wherein the second cam applies the second force to the first cam based on receiving a force associated with a weight of the door pivoting in the first direction, and wherein:

the casing includes a casing main body configured to movably accommodate the first cam therein and be rotatably connected to the second cam, and a plurality of hook protrusion protruding from the casino main body and fitted into the bracket, the casing has a plurality of fastening bosses coupled to fasteners extending through the bracket, respectively, and each of the plurality of hook protrusions is disposed adjacent to a corresponding one of the plurality of fastening bosses, and is disposed closer to the corresponding one of the plurality of fastening bosses than to another, adjacent one of the plurality of hook protrusions.

2. The home appliance of claim 1, wherein the biasing element comprises a spring configured to apply the first force to the first cam such that the first cam moves in the fourth direction.

3. The home appliance of claim 2, wherein the spring includes an elastic member configured to generate an elastic force to press the first cam in the fourth direction, and wherein the first force includes the elastic force generated from the elastic member.

4. The home appliance of claim 1, wherein a magnitude of the second force increases as an opening angle of the door increases, wherein the magnitude of the second force is smaller than a magnitude of the first force when the opening angle of the door is less than a predetermined opening angle, and wherein the magnitude of the second force is equal to or greater than the magnitude of the first force when the opening angle of the door is equal to or greater than the predetermined opening angle.

5. The home appliance of claim 4, wherein the second force corresponds to a sum of the force associated with the weight of the door pivoting in the first direction and a friction force occurring between the first cam and the second cam.

6. The home appliance of claim 5, wherein each of the magnitude of the first force and a magnitude of the force associated with the weight of the door increases as the opening angle of the door increases, and wherein an absolute value of a magnitude of a resultant force, corresponding to a sum of the first force and the second force, is equal to or smaller than an absolute value of a magnitude of the friction force occurring between the first cam and the second cam when the opening angle of the door is equal to or greater than the set angle.

7. The home appliance of claim 1, wherein the casing further includes a protrusion protruding from the casing main body in a vertical direction or a lateral direction, wherein at least one of the plurality of fastening bosses is disposed on the protrusion, and wherein at least one of the plurality of hook protrusions is disposed on the protrusion or between the casing main body and the protrusion.

8. The home appliance of claim 7, wherein the hinge assembly includes a hinge arm fixed to the main body and protruding toward the casing to support the second cam, wherein the protrusion protrudes upward from the casing main body and is disposed to face the hinge arm in a front and rear direction, and wherein the hinge arm interferes with the protrusion to regulate a rotation range of the casing.

9. The home appliance of claim 1, wherein the bracket has a fastening hole defined therein through which one the fasteners passes.

10. The home appliance of claim 9, wherein the fastening hole includes a pair of fastening holes defined to be spaced apart from each other in a lateral direction, and wherein a length in the lateral direction of at least one of the pair of fastening holes is greater than a length in the lateral direction of the fastening boss.

11. The home appliance of claim 1, wherein the bracket has a pair of hook holes defined therein, each of the pair of hook holes being configured to allow one of the hook protrusions to pass therethrough, wherein one of the hook protrusions includes a horizontal protrusion protruding from the casing main body such that an end thereof passes through the hook hole, and a vertical protrusion protruding upward from the end of the horizontal protrusion, wherein the pair of hook holes are spaced apart from each other in a lateral direction, and wherein at least one of the pair of hook holes is open downwards in the bracket.

12. The home appliance of claim 11, wherein a first one of the pair of hook holes is provided higher than a second one of the pair of hook holes and is spaced apart from a lower end of the bracket, wherein the lower end of the bracket is open, and the second one of the pair of hook holes is open downwards in the bracket via the open lower end of the bracket.

13. The home appliance of claim 1, wherein the bracket has a fastening hole defined therein through which one the fasteners passes and a hook hole defined through which the hook protrusion passes.

14. The home appliance of claim 13, wherein the fastening hole includes a pair of fastening holes defined to be spaced apart from each other in a lateral direction, and a length in the lateral direction of at least one of the pair of fastening holes is greater than a length in the lateral direction of the fastening boss, and wherein the hook hole includes a pair of hook holes defined to be spaced apart from each other in a lateral direction, and at least one of the pair of hook holes is open downwards in the bracket.

15. The home appliance of claim 1, wherein the hinge assembly includes a sliding protrusion extending from the first cam, and wherein the casing includes a sliding groove to receive the sliding protrusion to prevent a rotation of the first cam.

16. The home appliance of claim 1, wherein the hinge assembly includes a shaft, and wherein the shaft is fixed to the second cam, and the first cam is slidably coupled to the shaft.

17. The home appliance of claim 16, wherein the first cam includes a sloped end surface configured to contact a sloped end surface of the second cam.

* * * * *